United States Patent
Saber et al.

(10) Patent No.: US 10,560,221 B2
(45) Date of Patent: Feb. 11, 2020

(54) APPARATUS AND METHODS FOR TRAINING-BASED CHANNEL CODE DESIGN

(71) Applicant: HUAWEI TECHNOLOGIES CO., LTD., Shenzhen, Guangdong (CN)

(72) Inventors: Hamid Saber, Ottawa (CA); Yiqun Ge, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/852,174

(22) Filed: Dec. 22, 2017

(65) Prior Publication Data

US 2018/0191465 A1    Jul. 5, 2018

Related U.S. Application Data

(60) Provisional application No. 62/442,652, filed on Jan. 5, 2017.

(51) Int. Cl.
*H04L 1/00* (2006.01)
*H04J 13/10* (2011.01)

(52) U.S. Cl.
CPC ............ *H04L 1/0076* (2013.01); *H04J 13/10* (2013.01)

(58) Field of Classification Search
CPC ... H04L 1/0076; H04L 1/0045; H04L 1/0057; H04L 1/0041; H04J 13/10; H04J 13/004
See application file for complete search history.

(56) References Cited

U.S. PATENT DOCUMENTS

| | | | | |
|---|---|---|---|---|
| 2010/0017674 A1* | 1/2010 | Mo | ........................ | H04L 1/1816 714/749 |
| 2010/0128765 A1* | 5/2010 | Schober | ................ | H04L 1/0003 375/220 |
| 2015/0194987 A1* | 7/2015 | Li | ......................... | H04L 1/0057 714/752 |

(Continued)

FOREIGN PATENT DOCUMENTS

| | | |
|---|---|---|
| CN | 104539393 A | 4/2015 |
| EP | 2555479 A1 | 2/2013 |

OTHER PUBLICATIONS

E. Arikan, "Channel polarization: A method for constructing capacity-achieving codes for symmetric binary-input memoryless channels," IEEE Transactions on Information Theory, vol. 55, No. 7, 2009, pp. 3051-3073.

(Continued)

*Primary Examiner* — Syed Haider

(57) ABSTRACT

One or more codewords are generated by encoding input bits at input bit positions onto sub-channels that are provided by a code. Each of the sub-channels has an associated reliability of correct decoding of an input bit at an input bit position. Each codeword is transmitted to a decoder, and a word based on each transmitted codeword is received at the decoder. Each received word is decoded, and the reliabilities of the sub-channels are determined based on decoded bits and known input bits from which each codeword was generated. An indication that is based on the determined reliabilities of the sub-channels, such as an indication of the determined reliabilities, is transmitted to the encoder, and may be used by the encoder in selecting the sub-channels for encoding subsequent input bits, for example.

20 Claims, 12 Drawing Sheets

(56) References Cited

U.S. PATENT DOCUMENTS

2015/0263767 A1* 9/2015 Shin ................... H03M 13/134
714/796

OTHER PUBLICATIONS

Tal and Vardy, "List Decoding of Polar Codes", Proceedings of the 2011 IEEE International Symposium on Information Theory, Jul. 2011, 11 pages.

3GPP TSG RAN WG1 Meeting #87 R1-1611254,"Details of the Polar code design",Huawei, HiSilicon,Nov. 10-14, 2016, total 15 pages.

* cited by examiner $$G_2 = \begin{bmatrix} 1 & 0 \\ 1 & 1 \end{bmatrix} \quad G_2^{\otimes 2} = \begin{bmatrix} G_2 & 0 \\ G_2 & G_2 \end{bmatrix} \quad G_2^{\otimes 3} = \begin{bmatrix} G_2 & 0 & 0 & 0 \\ G_2 & G_2 & 0 & 0 \\ G_2 & 0 & G_2 & 0 \\ G_2 & G_2 & G_2 & G_2 \end{bmatrix}$$

$$G_2^{\otimes 2} = \begin{bmatrix} 1 & 0 & 0 & 0 \\ 1 & 1 & 0 & 0 \\ 1 & 0 & 1 & 0 \\ 1 & 1 & 1 & 1 \end{bmatrix} \leftarrow 102$$

$$G_2^{\otimes 3} = \begin{bmatrix} 1 & 0 & 0 & 0 & 0 & 0 & 0 & 0 \\ 1 & 1 & 0 & 0 & 0 & 0 & 0 & 0 \\ 1 & 0 & 1 & 0 & 0 & 0 & 0 & 0 \\ 1 & 1 & 1 & 1 & 0 & 0 & 0 & 0 \\ 1 & 0 & 0 & 0 & 1 & 0 & 0 & 0 \\ 1 & 1 & 0 & 0 & 1 & 1 & 0 & 0 \\ 1 & 0 & 1 & 0 & 1 & 0 & 1 & 0 \\ 1 & 1 & 1 & 1 & 1 & 1 & 1 & 1 \end{bmatrix}$$

Successive Cancellation Decoding for $i = 0, 1, \ldots, n-1$ do
 if $\hat{u}_i$ is frozen then set $\hat{u}_i$ accordingly;
 else
  if $W_i(y_0^{n-1}, \hat{u}_0^{i-1}|0) > W_i(y_0^{n-1}, \hat{u}_0^{i-1}|1)$ then
   set $\hat{u}_i \leftarrow 0$;
  else
   set $\hat{u}_i \leftarrow 1$;

$F = \{0, 1, 2, 4\}$

From 0 till $N - 1$ if $i \in F, \hat{u}_i = 0$ if $i \in F^c$, $$\hat{u}_i = \begin{cases} 0, & \text{if } \dfrac{P(0 \mid \hat{u}_0^{i-1}, \bar{y})}{P(1 \mid \hat{u}_0^{i-1}, \bar{y})} > 1 \\ 1, & \text{otherwise} \end{cases}$$

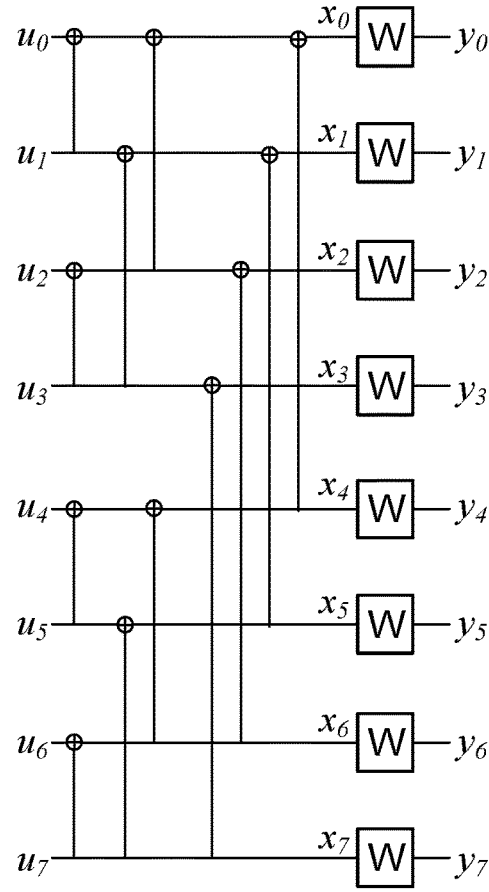

FIG. 3

APPARATUS AND METHODS FOR TRAINING-BASED CHANNEL CODE DESIGN

CROSS-REFERENCE TO RELATED APPLICATIONS

The present application claims the benefit of U.S. Provisional Application No. 62/442,652, filed on Jan. 5, 2017, entitled "APPARATUS AND METHODS FOR TRAINING-BASED CHANNEL CODE DESIGN", the entire contents of which are incorporated herein by reference.

FIELD

The present disclosure relates to generally to communications and, in particular, to channel code design.

BACKGROUND

Channel coding is an integral part of many communication systems. From the Shannon channel coding theorem, a fundamental performance limit of channels in such communication systems can be achieved by employing channel codes. Following Shannon's work in 1948, there have been significant developments in designing channel codes that can approach or achieve channel capacity. Such code design involves a mathematical description of a channel which, in the context of information theory, is equivalent to describing the channel as a set of transition probability density functions from an input channel alphabet to an output alphabet. Once a communication channel is represented with such an information theoretical model, code design techniques in coding theory can be employed to construct codes that can approach or achieve the capacity of the modeled channel. Numerous classes of codes have been developed to achieve the capacity of such channels. Among the most promising of these codes are Low Density Parity Check (LDPC) codes, Irregular Repeat-Accumulate (IRA) codes, convolutional codes, turbo codes, and polar codes.

Polar codes, for example, are proposed as channel codes for use in future wireless communications, and have been selected for uplink and downlink enhanced Mobile Broadband (eMBB) control channel coding for the new $5^{th}$ Generation (5G) air interface, also known as the 5G New Radio (NR). These codes are competitive with state-of-the-art error correction codes and have low encoding complexity. See E. Arikan, "Channel polarization: A method for constructing capacity-achieving codes for symmetric binary-input memoryless channels," IEEE Trans. Inf. Theory, vol. 55, no. 7, pp. 3051-3073, 2009. Successive Cancellation List (SCL) decoding and its extensions (e.g., SC List decoding) are effective and efficient options for decoding polar coded information.

Based on channel polarization, Arikan designed a channel code that is proven to reach channel capacity. Polarization refers to a coding property that, as code length increases to infinity, bit-channels (also referred to as sub-channels) polarize and their capacities approach either zero (completely noisy channel) or one (completely perfect channel). In other words, bits encoded in high capacity sub-channels will experience a channel with high Signal-to-Noise Ratio (SNR), and will have a relatively high reliability or a high likelihood of being correctly decoded, and bits encoded in low capacity sub-channels will experience a channel with low SNR, and will have low reliability or a low possibility to be correctly decoded. The fraction of perfect bit-channels is equal to the capacity of this channel.

SUMMARY

Illustrative embodiments are disclosed by way of example in the description and claims.

According to one aspect of the present disclosure, an apparatus includes an encoder to encode input bits at input bit positions onto sub-channels that are provided by a code. Each of the sub-channels has an associated reliability of correct decoding of an input bit at an input bit position. A transmitter is coupled to the encoder, to transmit codewords generated by the encoder. A receiver is also coupled to the encoder, to receive from a decoder of a codeword that was transmitted by the transmitter, an indication that is based on the reliabilities of the sub-channels.

An apparatus in accordance with a further aspect includes a receiver to receive from an encoder a word that is based on a codeword of a code. The code provides sub-channels onto which input bits at input bit positions are encoded, and each of the sub-channels has an associated reliability of correct decoding of an input bit at an input bit position. A decoder is coupled to the receiver, to decode the received word and to determine the reliabilities of the sub-channels based on decoded bits and known input bits from which the codeword was generated. A transmitter is also coupled to the decoder, to transmit to the encoder an indication that is based on the determined reliabilities of the sub-channels.

Methods are also disclosed. For example, a method according to one aspect of the present disclosure involves encoding input bits at input bit positions onto sub-channels that are provided by a code. As noted above and elsewhere herein, each of the sub-channels has an associated reliability of correct decoding of an input bit at an input bit position. Such a method may also involve transmitting codewords generated by the encoding; and receiving, from a decoder of a transmitted codeword, an indication that is based on the reliabilities of the sub-channels.

Another method involves receiving from an encoder a word that is based on a codeword of a code. The code providing sub-channels onto which input bits at input bit positions are encoded, and each of the sub-channels has an associated reliability of correct decoding of an input bit at an input bit position. A method may also involve decoding the received word; determining the reliabilities of the sub-channels based on decoded bits and known input bits from which the codeword was generated; and transmitting to the encoder an indication that is based on the determined reliabilities of the sub-channels.

According to a further aspect of the present disclosure, user equipment includes an apparatus that has an encoder to encode input bits at input bit positions onto sub-channels that are provided by a code. Each of the sub-channels has an associated reliability of correct decoding of an input bit at an input bit position. A transmitter is coupled to the encoder, to transmit codewords generated by the encoder. A receiver is also coupled to the encoder, to receive from a decoder of a codeword that was transmitted by the transmitter, an indication that is based on the reliabilities of the sub-channels.

Yet another aspect provides user equipment including an apparatus that has a receiver to receive from an encoder a word that is based on a codeword of a code. The code provides sub-channels onto which input bits at input bit positions are encoded, and each of the sub-channels has an associated reliability of correct decoding of an input bit at an input bit position. A decoder is coupled to the receiver, to decode the received word and to determine the reliabilities of the sub-channels based on decoded bits and known input bits from which the codeword was generated. A transmitter is also coupled to the decoder, to transmit to the encoder an indication that is based on the determined reliabilities of the sub-channels.

Communication network equipment could include an apparatus that has an encoder to encode input bits at input bit positions onto sub-channels that are provided by a code. Each of the sub-channels has an associated reliability of correct decoding of an input bit at an input bit position. A transmitter is coupled to the encoder, to transmit codewords generated by the encoder. A receiver is also coupled to the encoder, to receive from a decoder of a codeword that was transmitted by the transmitter, an indication that is based on the reliabilities of the sub-channels.

A further aspect of the present disclosure relates to communication network equipment that includes an apparatus having a receiver to receive from an encoder a word that is based on a codeword of a code. The code provides sub-channels onto which input bits at input bit positions are encoded, and each of the sub-channels has an associated reliability of correct decoding of an input bit at an input bit position. A decoder is coupled to the receiver, to decode the received word and to determine the reliabilities of the sub-channels based on decoded bits and known input bits from which the codeword was generated. A transmitter is also coupled to the decoder, to transmit to the encoder an indication that is based on the determined reliabilities of the sub-channels.

A non-transitory processor-readable medium, according to a further aspect of the present disclosure, stores instructions which, when executed by one or more processors, cause the one or more processors to perform a method. Such a method could include: encoding input bits at input bit positions onto sub-channels that are provided by a code, with each of the sub-channels having an associated reliability of correct decoding of an input bit at an input bit position as disclosed herein; transmitting codewords generated by the encoding; and receiving, from a decoder of a transmitted codeword, an indication that is based on the reliabilities of the sub-channels.

According to yet another aspect of the present disclosure, a non-transitory processor-readable medium stores instructions which, when executed by one or more processors, cause the one or more processors to perform a method that involves: receiving from an encoder a word that is based on a codeword of a code, with the code providing sub-channels onto which input bits at input bit positions are encoded and each of the sub-channels having an associated reliability of correct decoding of an input bit at an input bit position as disclosed herein; decoding the received word; determining the reliabilities of the sub-channels based on decoded bits and known input bits from which the codeword was generated; and transmitting to the encoder an indication that is based on the determined reliabilities of the sub-channels.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 1 is a diagram showing one example of how a polar coding generator matrix can be produced from a kernel.

FIG. 3 illustrates an example of an SC (Successive Cancellation) decoding algorithm.

DETAILED DESCRIPTION

Figure 2:
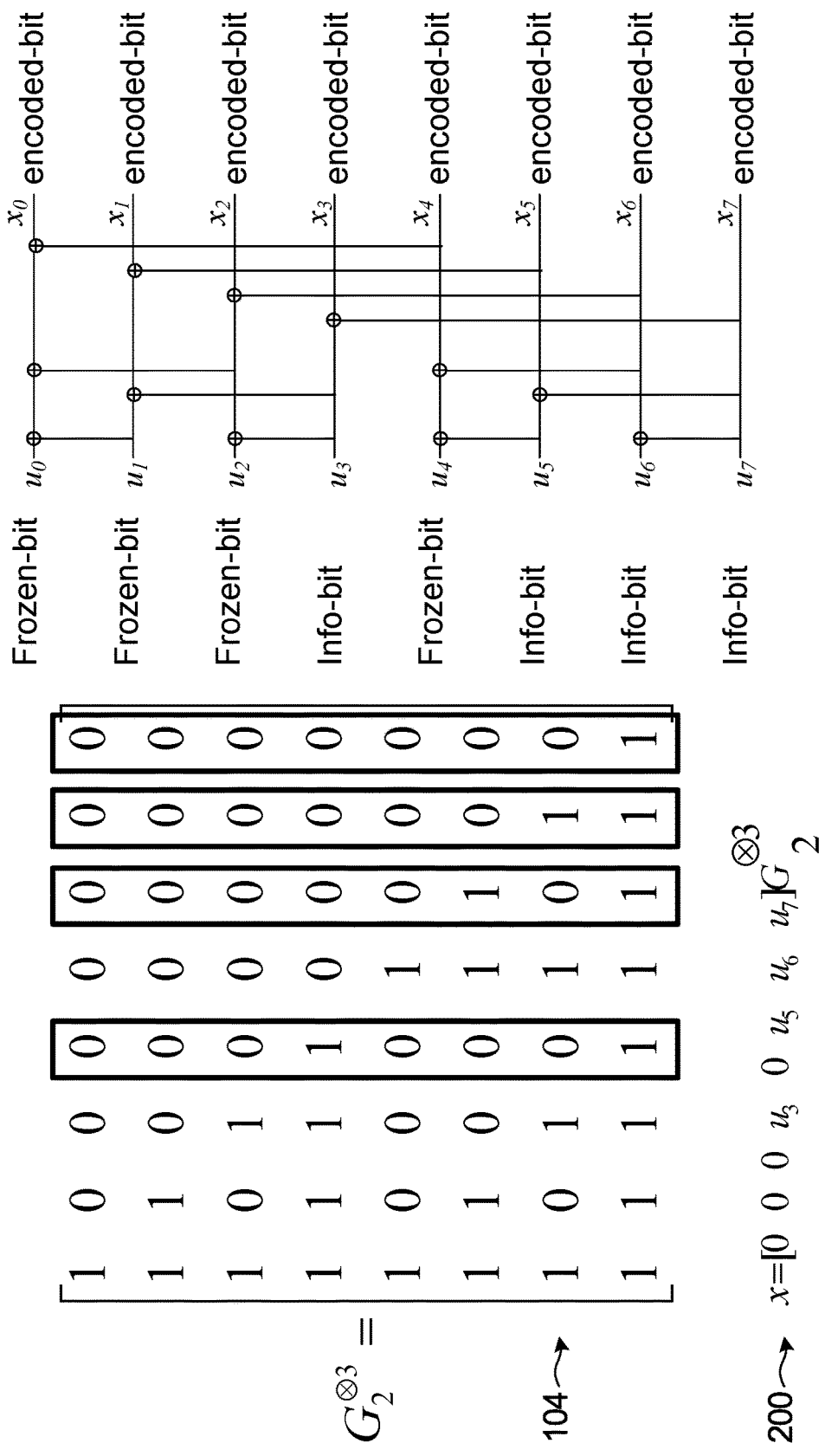
FIG. 2 is a diagram showing an example use of a polar coding generator matrix for producing codewords and a schematic illustration of an example polar encoder.

As noted above, conventional code design involves a mathematical description of a channel. However, accuracy of simple information theoretical channel models can be a fundamental concern in code design. In fact, a wireless channel that is actually observed by each user equipment (UE) in a mobile network can be very complex, because such a network involves many interacting processing blocks which may propagate errors through each other. For example, interference from other UEs and/or access points cannot be easily modeled into an information theoretical channel model to make code design more realistic. There are numerous other factors as well, such as the accuracy of a fading model, its type in both time and frequency domains, the effects of a non-binary constellation, and differences between a practical decoder and a theoretical decoder, for example, that may further impact the accuracy of a simple channel model. In fact, considering the factors noted above, it can be expected that simple channel models might not be good representatives of an actual communication channel. As a result, codes that achieve the capacity of a modeled channel, when employed in actual wireless channels, might not perform as well as they could if they were specifically designed for the actual channel.

A perfect mathematical model for the channel seen by each UE in a wireless mobile network could take into account all of the factors noted above, and a channel code could then be designed for that specific channel model. However, finding a perfect channel model is a difficult, if not impossible, task. An actual channel may have memory and be time-variant, further complicating the task of finding a perfect channel model. In addition, designing codes for simple information theoretical channel models can be a challenge, and designing codes for a more complex perfect channel model is even more challenging.

In the present disclosure, it is proposed to design a code for an actual wireless channel seen by a receiver, without an actual channel model and information theoretical code design techniques. Code design is integrated with code transmission over the actual channel. This is referred to herein as training-based code design or "transmit-and-design". The techniques proposed herein are applicable to codes having a property that each of multiple sub-channels provided by the code can be mapped to a position in an input vector, and has an associated reliability. Polar codes are among the codes to which the techniques proposed herein are applicable, and are described in detail as an illustrative example. A transmitter and a receiver are used on an actual channel instead of using channel models, and code design is adapted to the actual channel.

Polar codes are one class of structured capacity-achieving channel codes. In an embodiment, code length N of a polar code is power of 2. FIG. 1 is a diagram showing, by way of an illustrative example, how a polar coding generator matrix can be produced from a kernel $G_2$ 100. Note that FIG. 1 is an example. Other forms of kernels are also possible.

A polar code can be formed from a Kronecker product matrix based on a seed matrix $F=G_2$ 100. For a polar code having codewords of length $N=2^m$, the generator matrix is $G_2^{\otimes m}$. The 2-fold Kronecker product matrix $G_2^{\otimes 2}$ 102 and the 3-fold Kronecker product matrix $G_2^{\otimes 3}$ 104 in FIG. 1 are examples of polar coding generator matrices. The generator matrix approach illustrated in FIG. 1 can be expanded to produce an m-fold Kronecker product matrix $G_2^{\otimes m}$, for code length $N=2^m$.

FIG. 2 is a diagram showing an example use of a polar coding generator matrix for producing codewords and a schematic illustration of an example polar encoder. In general, $$x_0^{N-1}=[x_0,x_1,\ldots,x_{N-1}]$$

$$u_0^{N-1}=[u_0,u_1,\ldots,u_{N-1}]$$

$$x_0^{N-1}=u_0^{N-1}G_N$$

In FIG. 2, the generator matrix $G_2^{\otimes 3}$ 104 is used to produce codewords of length $N=2^3=8$. The codeword x is formed by the product of an input vector $u=[0\ 0\ 0\ u_3\ 0\ u_5\ u_6\ u_7]$ and the generator matrix $G_2^{\otimes 3}$ 104 as indicated at 200.

The input vector u is composed of information bits and fixed or frozen bits. In the specific example shown in FIG. 2, N=8, so the input vector u is an 8-bit vector, and the codeword x is an 8-bit vector. The input vector has frozen bits in positions 0, 1, 2 and 4, and has information bits at positions 3, 5, 6, and 7. An example implementation of an encoder that generates codewords is indicated at 212, where the frozen bits are all set to 0, and the circled "+" symbols represent modulo 2 addition. For the example of FIG. 2, an N=8-bit input vector is formed from K=4 information bits and N−K=4 frozen bits. Codes of this form are referred to as polar codes and the encoder is referred to as a polar encoder. Decoders for decoding polar codes are referred to as polar decoders. Frozen bits are set to zero in the example shown in FIG. 2. However, frozen bits could be set to other bit values that are known to both an encoder and a decoder. For ease of description, all-zero frozen bits are considered herein, and may be generally preferred.

As is known, polar coding may be performed with or without bit reversal. The example polar encoder in FIG. 2 is without bit reversal.

Generally, the output of a polar encoder can be expressed as $x_0^{N-1}=u_0^{N-1}G_N$, where, without bit reversal, $G_N=F^{\otimes n}$ is an N-by-N generator matrix, $N=2^n$, $n \geq 1$ (e.g. for n=1, $G_2=F$ (indicated as 100 in FIG. 1)). For bit reversal, $G_N=B_N F^{\otimes n}$, where $B_N$ is an N-by-N bit-reversal permutation matrix.

Embodiments disclosed herein could be implemented without or with bit reversal.

In polar code construction, ideally the more "reliable" positions of an input vector are used to carry the information bits, and the more "unreliable" positions of an input vector are used to carry the frozen bits (i.e., bits already known to both encoder and decoder). However, when information is transmitted over a physical channel, the reliability of a given bit position is also a function of the characteristics of the physical channel, such as the erasure rate or the Signal-to-Noise Ratio (SNR) of the physical channel. A reliability sequence (reliable and unreliable positions) could be calculated based on assumed or measured characteristics of the physical channel before the information is transmitted over the channel, for example. In theory, the frozen bits can be set to any value as long as the location and the value of each frozen bit is known to both the encoder and the decoder. In conventional applications, the frozen bits are all set to zero.

With a sufficiently long code length, a code designed according to polarization theory can reach the channel capacity in a binary symmetric memoryless channel if a Successive Cancellation (SC) decoding algorithm is used. A very simple SC decoding algorithm was analyzed and simulated by Arikan.

In practice, a code length cannot be infinite and a channel cannot be a binary memoryless channel, and therefore channel capacity cannot be reached by such a simple SC decoder. According to Arikan, the channel capacity can be approached when using SC decoding if a code length is over $2^{20}$ bits in an AWGN channel. Such a long code length is impractical in wireless communications, for example.

Assistant or error-detecting code (EDC) bits can be included in the input vector to assist in decoding. A cyclic redundancy check (CRC) code could be used as an EDC. More than one EDC could be used within one codeword. It should be understood that other EDCs, such as a checksum code or a Fletcher Code, may be used. Some EDCs are also error-correcting codes (ECCs).

CRC bits, for example, are generated based on the information bits being transmitted. CRC bits are generally placed in more reliable positions in the input vector, although CRC bits may also or instead be placed in other positions in the input vector. CRC bits may be used in path selection for List decoding, for example, to improve polar code performance. During encoding, an N-bit input vector could be formed from K information bits, including one or more CRC bits, and (N−K) frozen bits. In this example, starting with a number of input bits, a CRC is calculated and appended to the input bits to produce a set of K information bits including the input bits and the CRC bits. The remaining (N−K) frozen bits are inserted to produce an N-bit input vector, where N is a power of 2 in an Arikan polar code. The input vector is then multiplied by a generator matrix for a polar code to produce an N-bit codeword.

The codeword is transmitted over a channel, and a receiver, in turn, receives a word. Due to channel effects such as noise, the received word might not be identical to the transmitted codeword. A decoder attempts to decode the received word to determine information bits in the original input vector.

During decoding of a codeword encoded from an input vector, the locations and values of frozen bits in the input vector are treated as known. For descriptive simplicity, bits of the input vector that are not known to the decoder in advance will be referred to as "unknown" bits. For example, the information bits including the CRC bits are unknown bits. Some polar decoders use SC decoding as noted above, in which the unknown bits are decoded sequentially and successive cancellation is applied. Once a particular decision has been made regarding how an unknown bit is to be decoded, SC polar decoders do not allow that bit to be changed or corrected, and the decoder moves on to decoding the next unknown bit. FIG. 3 illustrates an example of an SC decoding algorithm.

Another type of polar decoding algorithm, which is an extension of SC polar decoding but with better error correction performance and greater space efficiency, referred to as a List decoder, is described in "List Decoding of Polar Codes" by Tal and Vardy, *Proceedings of the* 2011 *IEEE International Symposium on Information Theory*, pp. 1-5 (July 2011). In a List decoder, successive levels of a binary decision tree are generated, each level corresponding to a decision on a respective unknown bit. Each path in the decision tree from the root node to leaf nodes represents a possible partial decoded sequence of unknown bits and has a corresponding likelihood. Typically, during generation of the decision tree, at each level of the decision tree where the number of paths grows beyond a set threshold L, the L paths having the highest likelihoods are identified, and the remaining paths are discarded. Some List decoders may also make use of CRC bits included in the codeword to assist in decoding. For example, if the codeword includes encoded CRC bits for the previous information bits, then once the decision tree is generated, each of the surviving paths that corresponds to the decoded information bits is checked against the CRC bits represented in each of the surviving paths. The decoder then outputs as a decoded vector the information bits in the surviving path that passes the CRC check. If more than one path passes the CRC check, then the decoder selects for output the path that passes the CRC check and has the highest likelihood, which may be determined according to a metric. If no path passes the CRC check, or if the codeword does not include encoded CRC bits, then the decoder selects for output the path that has the highest likelihood, which as noted above may be determined according to a metric.

Thus, there are two types of the decoding based on successive cancellation, including SC decoding and List decoding, which is also referred to as SCL decoding. For every decoded bit, a decoding path generates 2 leaf branches (bit=0|1) for the next decoding bit. An SC decoder tracks only one decoding path. After the value of a decoded bit is estimated, the other possible value is ignored. Decoding continues with the next bit, assuming that each previous bit has been correctly estimated when updating partial sum results.

Although tracking multiple decoding paths as in SCL decoding may offer better decoding performance than single-path tracking as in SC decoders, multi-path decoder size and complexity increase with codeword length and with list size L. For example, for a codeword length N=8 with a 2-by-2 kernel, there are $2^8$=256 possibilities for estimated values $\hat{u}_0$ to $\hat{u}_7$. As codeword length increases, the number of possibilities grows exponentially, and tracking of all decoding paths for all combinations of $\hat{u}_x$ becomes impractical. By tracking multiple decoding paths according to a list of size L, SCL decoders may still offer better decoding performance than SC decoders, with reasonable size and complexity. An SCL decoder monitors the best L decoding paths and estimates information bit values for the L decoding paths by combining Log Likelihood Ratio (LLR) values with previously computed partial sum values.

Each decoding path from the root (decoded bit #0) of a decoding tree is associated with a Path Metric (PM). A decoding path appends each newly decoded bit to previous estimated values. After the LLR computations for each decoded bit, path metrics are continuously updated using the LLR values as follows:
   if the LLR value >=0
      PM[0, i+1]=PM[i]
      PM[1, i+1]=PM[i]+|LLR|
   if the LLR value <0
      PM[0, i+1]=PM[i]+|LLR|
      PM[1, i+1]=PM[i].

The best decoding paths have the smallest PM values. If an LLR is less than 0, then decoded bit is most likely a 1, so the next PM for the estimated value 1 (PM[1, i+1]) remains the same as the current path metric, and the absolute LLR value is added to the PM for the estimated value 0 (PM[0, i+1]), in effect "penalizing" the less likely path with the absolute LLR value. If the LLR value is near 0, then the decision for the value of $\hat{u}_x$ is unreliable and the PM penalty on the penalized path is small.

For every decoded bit in a decoding tree, each decoding path produces 2 new decoding paths for a 2-by-2 kernel in the example shown. Each "leaf" decoding path inherits the LLR, partial sum, and PM values from its parent. After the number of decoding paths reaches L, an SCL decoder selects, based on the 2L PMs for the 2L candidate decoding paths, the L paths with the lowest PMs, and drops the other L decoding paths. The selected L paths are sorted using the PMs. For example, path sorting could assign path identifiers (IDs) or indices to the selected paths, with the path having the best PM being assigned a path ID #1, a path with the worst PM being assigned path ID #L, and other paths being assigned path IDs #2 to #(L−1) in accordance with their PMs. New decoding path IDs could be assigned after each sort step, following estimation of each codeword bit.

Figure 4:
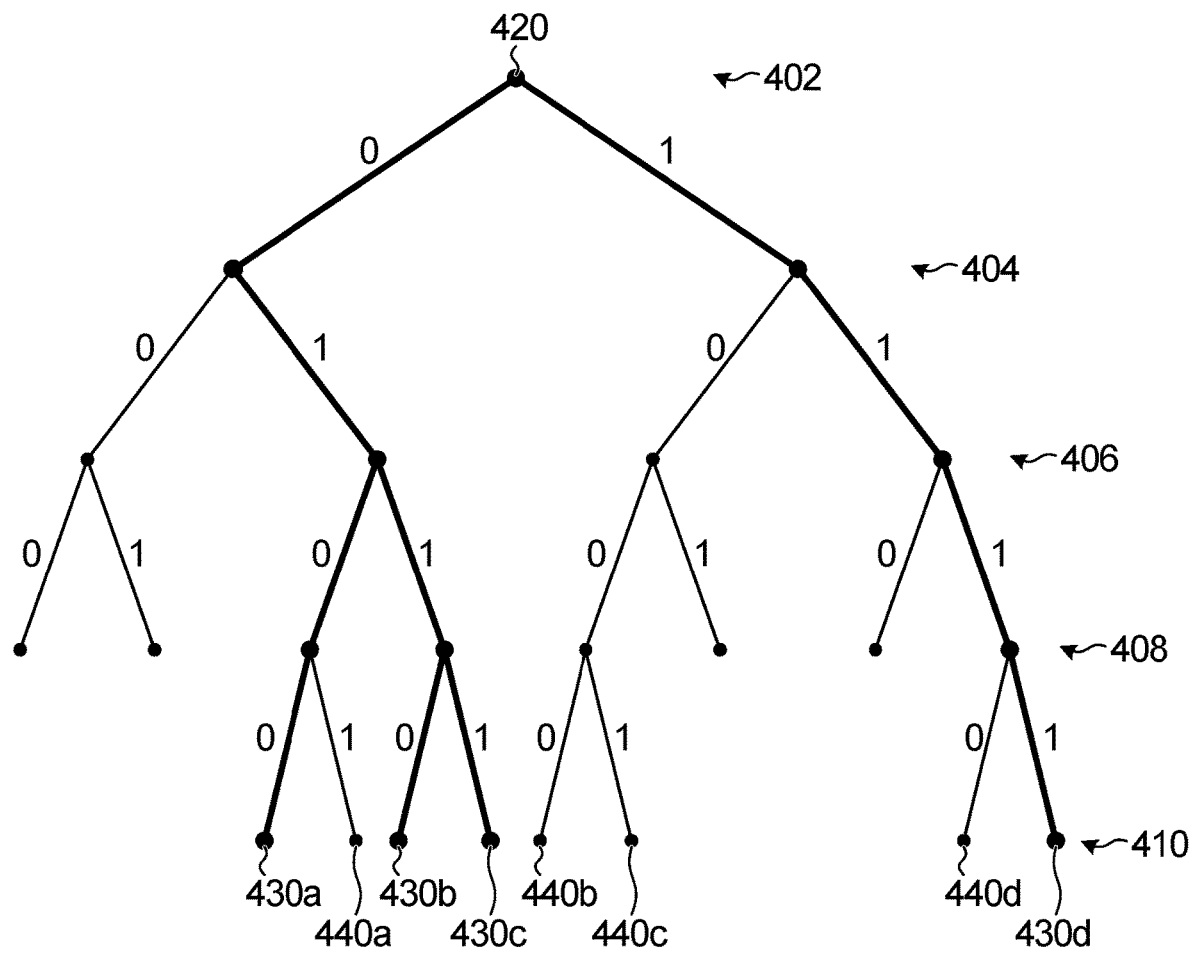
FIG. 4 is a diagram showing a portion of an example decision list tree whose width is limited by a given list size and used in an SCL (Successive Cancellation List) polar decoder.

FIG. 4 is a diagram showing a portion of an example decision list tree used in an SCL polar decoder, whose width is limited by a given list size L. In FIG. 4 the list size L is 4. Five levels 402, 404, 406, 408, 410 of the decision tree are illustrated. Although five levels are illustrated, it should be understood that a decision tree to decode K information bits (including CRC bits) would have K+1 levels. At each level after the root level 402, each one of up to 4 surviving decoding paths is extended by one bit. The leaf or child nodes of root node 420 represent possible choices for a first bit, and subsequent leaf nodes represent possible choices for subsequent bits. The decoding path from the root node 420 to leaf node 430a, for example, represents an estimated codeword bit sequence: 0, 1, 0, 0. At level 408, the number of possible paths is greater than L, so L paths having the highest likelihood (e.g., best PMs) are identified, and the remaining paths are discarded. The decoding paths that survive after the path sort at level 406 are shown in bold in FIG. 4. Similarly, at level 410, the number of possible paths is again greater than L, so the L paths having the highest likelihood (e.g., best PMs) are identified, and the remaining paths are again discarded. In the example shown, the paths terminating in leaf nodes 430a, 430b, 430c, and 430d represent the highest likelihood paths. The paths terminating in leaf nodes 440a, 440b, 440c, 440d are the lower likelihood paths which are discarded.

SCL decoding can be further divided into pure list decoding in which survivor paths with the highest likelihood are selected and CRC-Aided SCL (CA-SCL) decoding where CRC bits are used for path selection. SC decoding is a special case of pure list decoding, with list size L=1. A CRC may provide better error correction performance in the final path selection, but is optional in SCL decoding. Other decoding-assistant operations, such as a Parity Check (PC) based on parity or "PC" bits that are included in an input vector, could be used instead of or jointly with CRC bits in path selection during decoding or in the final path selection.

SCL decoding largely improves the performance of a polar code for a limited code size. However, compared with the similar code length and code rates of Low Density Parity Check (LDPC) codes and Turbo codes, SCL decoding may have a worse Block Error Rate (BLER) than well-designed LDPC and Turbo codes. CA-SCL decoding may improve the performance of a polar code with a limited code length. For example, a CA-SCL decoder with a list size L=32 could provide for much better performance than LDPC and Turbo codes with similar computational complexity.

Figure 5:
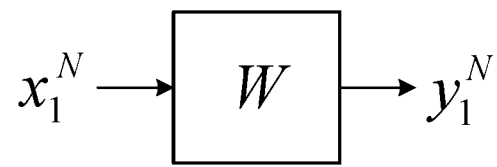
FIG. 5 is a block diagram illustrating transmission of a codeword x over a binary output symmetric channel W.
Figure 6:
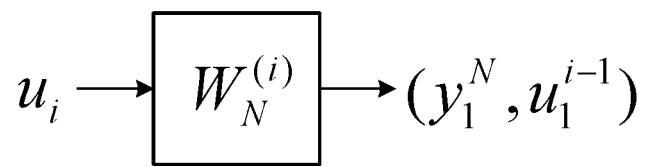
FIG. 6 is a block diagram illustrating a bit-channel $W_N^{(i)}$.

FIGS. 1 to 4 and the description above provide general information regarding polar codes, as an example of codes which exhibit a sub-channel and input bit position reliability property that can be assessed by decoding one or more known training sequences. FIG. 5 is a block diagram illustrating transmission of a codeword x over a binary output symmetric channel W. FIG. 6 is a block diagram illustrating a bit-channel $W_N^{(i)}$, which is also referred to herein as a sub-channel. A polar code of length N has N bit-channels or sub-channels, each of which has an associated reliability, and each of which can be mapped to an input bit position. Although indices herein may refer to bit positions and bit-channels, the present techniques could be applied to multi-bit symbols. Bit positions could therefore be positions of multi-bit symbols in some embodiments, and similarly a bit-channel or sub-channel could be associated with symbols that include multiple bits.

In an Additive White Gaussian Noise (AWGN) channel, a polar code in effect provides N sub-channels. N is referred to as mother code length and is always a power of 2 in an Arikan polar code, which is based on a polar kernel that is a 2×2 matrix. A key to code construction for a polar code is to determine which sub-channels are selected or allocated for information bits and which sub-channels are allocated for frozen bits. In some embodiments, one or more sub-channels are also allocated to parity/PC, CRC, and/or other types of bits that are used to assist in decoding. In terms of polarization theory, the sub-channels that are allocated for frozen bits are called frozen sub-channels, and the sub-channels that are allocated for information bits are called information sub-channels, and additional assistant sub-channels may be allocated to assistant bits that are used to assist in decoding. In some embodiments, assistant bits are considered to be a form of information bits, for which more reliable sub-channels are selected or allocated.

Figure 7:
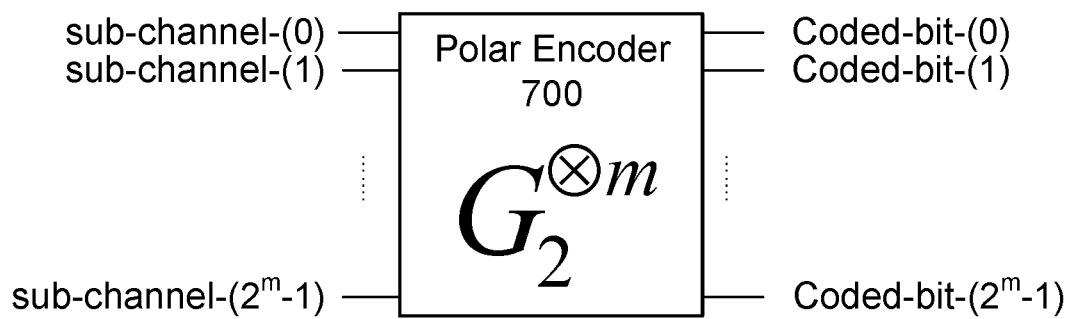
FIG. 7 is a block diagram illustrating an example of a polar encoder based on a 2-by-2 kernel.

Polar encoders based on Kronecker products of a 2-by-2 Arikan kernel $G_2$ are described above. FIG. 7 is a block diagram illustrating an example of a polar encoder 700 based on a 2-by-2 kernel. Sub-channels and coded bits are labeled in FIG. 7. As shown, a channel is divided into $N=2^m$ sub-channels, with indices 0 to $2^m-1$. Input bits, which include at least information bits and frozen bits, are allocated onto N sub-channels, and the resultant N-sized vector is multiplied with an N-by-N Kronecker matrix by the polar encoder to generate a codeword that includes N coded bits. The input bits could also include bits such as CRC bits or parity check bits. A sub-channel selector (not shown) could be coupled to the polar encoder 700 to select sub-channels for information bits and any assistant bits, with any remaining sub-channels being frozen sub-channels.

In polar code design for an (N, K) polar code, the reliabilities of the N sub-channels $W_N^{(i)}$ are determined, and the K sub-channels with the largest reliabilities are allocated or selected as information sub-channels to carry information bits. The remaining N−K sub-channels are allocated or selected as frozen sub-channels to carry frozen bits. In an embodiment, an information sub-channel set contains indices of the K sub-channels with the K highest reliabilities, and a frozen sub-channel set contains indices of the remaining N−K sub-channels with lower reliabilities. Frozen bits in bit positions that are associated with the frozen sub-channels are set to zero or another value that is known to both an encoder and a decoder.

Under an assumption that the channel W is a binary erasure channel (BEC) with the same capacity as W with erasure probability ε, code design could involve setting $\varepsilon_1^{(1)}=\varepsilon$, calculating $\varepsilon_N^{(i)}$ recursively as $$\varepsilon_N^{(2i-1)}=2\varepsilon_{N/2}^{(i)}(1-\varepsilon_{N/2}^{(i)})$$

$$\varepsilon_N^{(2i)}=(\varepsilon_{N/2}^{(i)})^2$$

and choosing the K sub-channels with the smallest $\varepsilon_N^{(i)}$ values as the information sub-channels. Such code design may be simple and fast, but BEC might not be a realistic assumption for an actual channel, leading to performance loss.

In a Density Evolution (DE) technique, a transition LLR density of W is determined as $f_W^{(0)}(x)$, by:

setting $f_1^{(1)}(x)=f_W^{(0)}(x)$;
calculating $f_N^{(i)}(x)$ recursively as $$f_N^{(2i-1)}(x)=f_{N/2}^{(i)}(x)\Theta f_{N/2}^{(i)}(x)$$

$$f_N^{(2i)}(x)=f_{N/2}^{(i)}(x)\otimes f_{N/2}^{(i)}(x)$$

where ⊗ denotes variable convolution and Θ denotes check node convolution;
calculating the error probability of the sub-channel $W_N^{(i)}$ as the area under $f_N^{(i)}(x)$ for x<0; and
choosing the K sub-channels with the smallest error probabilities as the information sub-channels.

DE code design may have superior performance relative to BEC-based code design, with complexity O(N), but there could be numerical instability in evaluating both types of convolution, and challenges with implementation for at least certain ranges of code rates.

A related Gaussian Approximation (GA) technique involves performing DE, but assuming that all densities are symmetric Gaussian. For example, let $\mu_N^{(i)}$ be the mean of $f_N^{(i)}(x)$ and $\mu^{(W)}$ be the mean of $f_W^{(0)}(x)$. Then:

set $\mu_1^{(1)}=\mu^{(W)}$;
calculate $\mu_N^{(i)}$ recursively as $$\mu_N^{(2i-1)}=\varphi^{-1}(1-(1-\varphi(\mu_{N/2}^{(i)}))^2)$$

$$\mu_N^{(2i)}=2\mu_{N/2}^{(i)}$$

where $\varphi(\mu)=1-E(\tanh(X/2))$ in which X is symmetric Gaussian with mean μ; and choose the K sub-channels with the largest mean values $\mu_N^{(i)}$ as the information sub-channels.

Compared to the DE technique described above, the GA technique has complexity O(N) with no need for convolution, but also has performance loss compared to DE as a result of the Gaussian approximation.

Another technique referred to as channel degradation or Tal-Vardy involves transforming sub-channels to channels with a particular alphabet size. Sub-channels with a larger alphabet size are degraded, and sub-channels with a smaller alphabet size are upgraded, to channels with the particular alphabet size. The error probabilities of the sub-channels are determined from the transformed sub-channels, and the K sub-channels with the smallest error probabilities are chosen as the information sub-channels. This technique may provide a performance gain over the DE technique, but involves additional complexity to find the transformed channels.

According to a Polarization Weight (PW) technique, for i=1, ..., N:

the binary representation of $i-1 = i_{n-1} i_{n-2} \ldots i_1 i_0$ is found; and a polarization weight $$\omega_i = \sum_{j=0}^{n-1} i_j 2^{j/4}$$

is calculated.

The K sub-channels with the largest polarization weights are chosen as the information sub-channels. Potential benefits of this technique include its simplicity, and good performance over a relatively wide range of Signal to Noise Ratios (SNRs). However, this technique is independent of the actual channel.

These techniques are illustrative of conventional techniques for code design. However, codes such as polar codes are well-known to be channel specific, and therefore channel models are used in code design for such codes. Conventional channel models for polar code design are too simple to be effective. For example, the actual wireless channel is often non-binary (e.g., in Quadrature Amplitude Modulation (QAM) such as 64QAM), and is also more complicated than conventional information theoretical models. Such models do not capture such channel characteristics as interference from other UEs or access points, imperfect communication channel elements between a transmitter and a receiver, channel estimation errors, types of fading in both time and frequency domains, the precision of timing and carrier recovery, Doppler shift, and possibly others.

The accuracy of a channel model is crucial in a model-based code design technique. In the best case, a model-based code achieves the capacity of the modeled channel. Even if one could have accurate channel models, analytical code design using current model-based methods would be too complicated to be practical. Current code design methods might not even work at all for an actual channel model. For example, an actual channel model could be time-varying, which is not captured by current code design methods. Code design for actual complex wireless channels may therefore be preferred over model-based code design.

According to an embodiment disclosed herein, given a modulation scheme and a demodulation scheme, a certain number of training sequences that are known to a receiver are encoded and transmitted to the receiver. Sub-channel reliabilities are determined at the receiver based on decoding of received words, and reliability information indicative of the determined sub-channel reliabilities is fed back from the receiver to the transmitter. An encoder is then able to select information and frozen sub-channels to design the code for the channel that is actually observed from the modulator at the transmitter to the demodulator at the receiver, and everything between the modulator and the demodulator.

This type of code design technique is not based on a channel model. A code is designed directly for the actual wireless channel as observed at the receiver. All factors affecting the channel, including intervening equipment or blocks between the transmitter and the receiver, interference from other UES and/or access points, jitter, fading, etc., are inherent in the actual observed channel at the receiver. Even inaccuracies in a channel model that is used for demodulation, or any other part of the observed channel, could be taken into account and compensated in code design.

In an embodiment, a transmit-and-design technique is iterative and based on Monte-Carlo simulation. Let $N=2^n$ be the length of a polar code to be designed. In each of one or more iterations, an information vector of length N is encoded at a transmitter and the resulting codeword is transmitted to a receiver. The information vector is known to the receiver. At the receiver, the received word is decoded, by SC decoding for example, and the reliability of each of the N sub-channels is updated. Such training iterations, based on codewords that were generated by encoding known information vectors, could end after processing of a certain predetermined number of transmitted codewords.

An example of such an iterative technique is provided below, for a polar code of length $N=2^n$ and a predetermined number of codeword or frame transmissions $\text{Max}_f$. The ordered set $\mathcal{A}$ referenced below includes indices of sub-channels in order of increasing reliability in this example.

---

1. $p = [p_1, p_2, \ldots, p_N] \leftarrow \text{zeros}(1, N)$ and $e = [e_1, e_2, \ldots, e_N] \leftarrow \text{zeros}(1, N)$
2. For $i_f = 1 : \text{Max}_f$
   | 2.1. Generate or otherwise provide an information vector of
   | length N, $u_1^N = [u_1, \ldots, u_N]$
   | 2.2. Encode the $u_1^N$ with a generator matrix $G_N = F^{\otimes n}$ to obtain
   | $x_1^N = u_1^N G_N$
   | 2.3. Transmit the codeword over the actual channel and calculate
   | the LLRs of the code bits, $\lambda_1^N = [\lambda_1, \ldots, \lambda_N]$
   | 2.4. For $i = 1, \ldots, N$
   | | q.1. Perform SC decoding to calculate $\hat{u}_i$ by calculating
   |
   | $\lambda(u_i) = \log \dfrac{W_N^{(i)}(\lambda_1^N, u_1^{i-1} | 0)}{W_N^{(i)}(\lambda_1^N, u_1^{i-1} | 1)}.$
   |
   | | Set $\hat{u}_i = 0$ if $\lambda(u_i) > 0$ and $\hat{u}_i = 1$ otherwise.
   | | q.2. If $\hat{u}_i = u_i$
   | | $e_i = 0$
   | | Else
   | | $e_i = 1$
   | | End
   | | q.3. Feed the correct bit value to the SC decoder
   | | Set $\hat{u}_i = u_i$
   | End
   | 2.5
   | $p \leftarrow \dfrac{i_f - 1}{i_f} p + \dfrac{e}{i_f}$
End
3. Sort p in ascending order: $p_{a_1} \leq p_{a_2} \leq \ldots \leq p_{a_N}$ and set $\mathcal{A} = \{a_1, a_2, \ldots, a_N\}$

---

In the above example, p and e are initialized to zero at 1. The operations at 2.1 to 2.5 are performed for each of $\text{Max}_f$ codewords. In each iteration, an input vector $u_1^N$ is generated, as a random vector for example, or otherwise provided, by reading from memory for example. Each $u_1^N$ is known to the receiver, and these input vectors can be considered as reference or training words. A corresponding codeword for each input vector, generated at 2.2, is transmitted to the receiver at 2.3. At 2.4, each bit in a word that is received by the receiver is decoded at q.1, using SC decoding in this example, and each decoded bit is compared at q.2 to a corresponding bit at the same position (i) in the known vector $u_1^N$. If the current decoded bit matches the corresponding bit in $u_1^N$, then no decoding error is counted for the current bit position, and the decoded bit is fed to the SC decoder at q.3. Otherwise, an error is counted at the current bit position, and the decoded bit is set to the correct information bit value in the known information vector and fed to the SC decoder at q.3. In the N iterations of the loop at 2.4, each $e_i$ bit position in the error vector e is set to either 0 or 1.

At 2.5, the error probability vector p is updated based on the current codeword iteration ($i_f$) and the current values of p and e. The error probability vector p includes an entry that is indicative of the error probability of each of the N sub-channels, as a fraction of the number of times out of $i_f$ that a decoded bit at position i is not correctly decoded. This type of error probability is an example of a sub-channel reliability, which could be determined differently in other embodiments.

After $Max_f$ iterations, the error probability vector has been updated $Max_f$ times. At 3, the entries in p are sorted in ascending order, although a descending sort order could be applied in other embodiments. The indices $\{\alpha_1, \alpha_2, \ldots, \alpha_N\}$ are indices of sub-channels, in ascending order of error probability $p_{\alpha_1} \leq p_{\alpha_2} \leq \ldots \leq p_{\alpha_N}$. The sub-channel with index $\alpha_1$ has the lowest error probability and therefore has the highest reliability, and the sub-channel with index $\alpha_N$ has the highest error probability and therefore has the lowest reliability. A sort order in ascending order of error probability is therefore equivalent to a decreasing order of reliability in this example.

The sorted set $\{\alpha_1, \alpha_2, \ldots, \alpha_N\}$ could be used in code design. In an embodiment to design an (N,K) polar code, once the sorted set $\{\alpha_1, \alpha_2, \ldots, \alpha_N\}$ is found, the first K indices are chosen as the information bits. That is, $\mu_{\alpha_1}, \mu_{\alpha_2}, \ldots, \mu_{\alpha_K}$ are chosen as information bits, and the remaining $\mu_{\alpha_{K+1}}, \mu_{\alpha_{K+2}}, \ldots, \mu_{\alpha_N}$ are frozen bits.

Once the training phase has ended after having transmitted $Max_f$ words to the receiver, the receiver can feed back code design information to the transmitter. In one embodiment, the receiver can send such information to the transmitter, via a feedback channel, the whole ordered set $\mathcal{A}$. The transmitter can then use the ordered set to obtain the information set of any desired length.

In another embodiment, the receiver can feed back to the transmitter partial information about the information set. For example, given N and K, the information sub-channels could be divided into chunks of length L. Having a total of N/L chunks, a chunk number i contains the sub-channels corresponding to $[\mu_{(i-1)L+1}, \ldots, \mu_{iL}]$ for i=1, ..., N/L. The receiver can then send to the transmitter the number of information/frozen sub-channels within each chunk, by sending $$\frac{N}{L}$$

integer numbers to the transmitter, for example. The transmitter can then construct the code by selecting the specified number of information sub-channels within each chunk using a reliability sequence $Q_L$ of length L. Some other partial information that could be fed back to the transmitter may include the position of the first information sub-channel, the position of the last frozen sub-channel etc.

In a different scenario, the transmitter can store a certain number of different reliability sequences and the receiver sends the index of the selected sequence to the transmitter. Different sequences may have been designed for different channel qualities and/or different coding rates and block lengths, for example.

It is also possible that the transmitter sends a channel quality index (CQI) which can be used to choose between a combination of modulation order, coding rate and reliability order sequences. This can be considered an alternative to the CQI usage in wireless standards such as LTE and 5G where different reliability sequences are also integrated in the CQI transmission.

Other types of indications are also possible. For example, in embodiments in which multiple ordered sub-channel sequences are stored at an encoder, the indication could be in the form of an offset or shift. The encoder could then change from an $i^{th}$ stored sequence to an $(i\pm offset)^{th}$ or $(i\pm shift)^{th}$ stored sequence for encoding.

An indication need not necessarily specify a particular ordered sequence or code parameters that should be used by the encoder. For example, an indication could signal that an encoder should change from its current code rate to a lower code rate or a higher code rate, without necessarily specifying what the new code rate should be.

The above examples of information that could be fed back to a transmitter are all illustrative of an indication, based on sub-channel relative reliabilities, that could be returned to an encoder by a decoder after the decoder decodes one or more reference or training words. These examples relate to explicit signaling. In other embodiments, such an indication could be implicitly signaled. Implicit signaling could involve a receiver or decoder feeding back a signal at a certain time and/or using a certain channel or communication resource, for example, to implicitly signal an indication that is based on sub-channel relative reliabilities based on reference or training word decoding.

Figure 8:
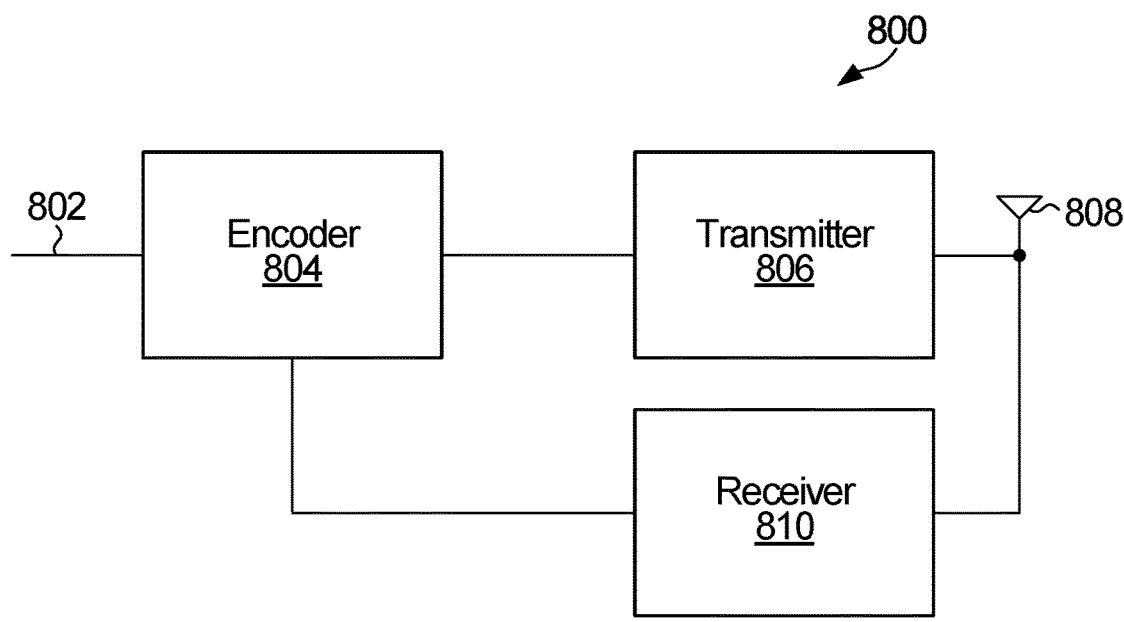
FIG. 8 is a block diagram of an example apparatus for encoding and transmitting codewords.

FIG. 8 is a block diagram of an apparatus for encoding and transmitting codewords. The apparatus 800 includes an encoder 804 coupled to a transmitter 806. In the illustrated embodiment, the apparatus 800 also includes an antenna 808, coupled to the transmitter 806, for transmitting signals over a wireless channel. In some embodiments, the transmitter 806 includes a modulator, an amplifier, and/or other components of a Radio Frequency (RF) transmit chain. The apparatus 800 also includes a receiver 810 coupled to the antenna 808 for receiving signals from a wireless channel. The receiver 810 is also coupled to the encoder 804. In some embodiments, the receiver 810 includes a demodulator, an amplifier, and/or other components of an RF receive chain.

The encoder 804 is implemented in circuitry, such as a processor, that is configured to encode input bits as disclosed herein. In a processor-based implementation of the encoder 804, processor-executable instructions to configure a processor to perform encoding operations are stored in a non-transitory processor-readable medium. The non-transitory medium could include one or more solid-state memory devices and/or memory devices with movable and possibly removable storage media. More generally, the encoder 804 may be implemented in hardware or circuitry (e.g. in one or more chipsets, microprocessors, application-specific integrated circuits (ASICs), field-programmable gate arrays (FPGAs), dedicated logic circuitry, or combinations thereof) so as to produce codewords as described herein for transmission by a separate (RF) unit.

In some alternative embodiments, the encoder 804, the transmitter 806, and/or the receiver 810 described herein may be fully or partially implemented in software or modules, for example in encoding, transmitting, and receiving modules stored in a memory and executed by a processor(s) of the apparatus 800.

The encoder 804 is configured to encode input bits at input bit positions onto sub-channels that are provided by a code. Each of the sub-channels has an associated reliability of correct decoding of an input bit at an input bit position. The transmitter 806 is configured to transmit codewords that are generated by the encoder 804. The receiver 810 is configured to receive, from a decoder of a codeword that was transmitted by the transmitter 806, an indication that is based on the reliabilities of the sub-channels. The indication could be an indication of the reliabilities of the sub-channels. Other examples of such an indication are also disclosed herein.

The apparatus 800 could implement any of various other features that are disclosed herein. For example, any one or more of the following could be provided, alone or in any of various combinations, in embodiments:

the code is a polar code;

the encoder includes, or is coupled to, a sub-channel selector that is configured to select from the sub-channels information sub-channels onto which information bits in further input bits are to be encoded;

the encoder is configured to encode multiple known information vectors onto the sub-channels and to transmit a codeword generated from encoding each of the known information vectors to the decoder;

the indication is based on whether the known information vectors are successfully decoded by the decoder;

the indication comprises sorted indices of the input bit positions or sorted indices of the sub-channels.

Although some of the example features above refer to particular components being configured to perform certain operations, in other embodiments such features could be provided by other components. For example, a processor could be configured to perform any of various operations that are disclosed herein by way of example in association with other components and/or in the context of method embodiments.

Figure 9:
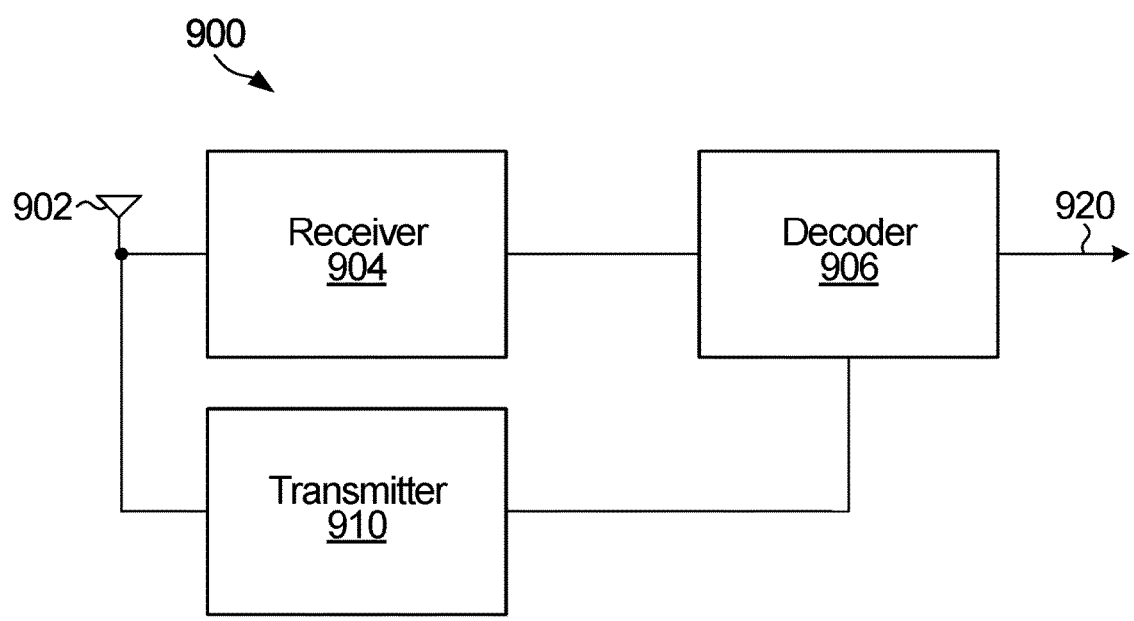
FIG. 9 is a block diagram of an example apparatus for receiving and decoding codewords.

FIG. 9 is a block diagram of an example apparatus for receiving and decoding codewords. The apparatus 900 includes a receiver 904 coupled to an antenna 902 for receiving signals from a wireless channel, and a decoder 906. In some embodiments, the receiver 904 includes a demodulator, an amplifier, and/or other components of an RF receive chain. Decoded bits are output at 920 for further receiver processing. The apparatus 900 also includes a transmitter 910 coupled to the antenna 902 for transmitting signals over a wireless channel. The transmitter 910 is also coupled to the decoder 906. In some embodiments, the transmitter 910 includes a modulator, an amplifier, and/or other components of an RF transmit chain.

In some embodiments, the apparatus 900, and similarly the apparatus 800 in FIG. 8 as noted above, include a non-transitory computer readable medium that includes instructions for execution by a processor to implement and/or control operation of the encoder 804 in FIG. 8, to implement and/or control operation of the decoder 906 in FIG. 9, and/or to otherwise control the execution of methods described herein. In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which could be, for example, a compact disc read-only memory (CD-ROM), universal serial bus (USB) flash disk, or a removable hard disk.

In some alternative embodiments, the receiver 904 and the decoder 906 described herein may be fully or partially implemented in software or modules, for example in receiving and decoding modules stored in a memory and executed by a processor(s) of the apparatus 900. In some embodiments, the decoder 906 may be implemented in hardware or circuitry (e.g. in one or more chipsets, microprocessors, ASICs, FPGAs, dedicated logic circuitry, or combinations thereof) so as to decode codewords that are received by a separate (RF) unit.

The receiver 904 is configured to receive from an encoder a word that is based on a codeword of a code. The code provides sub-channels onto which input bits at input bit positions are encoded, and each of the sub-channels has an associated reliability of correct decoding of an input bit at an input bit position. The decoder 904 is configured to decode the received word and to determine the reliabilities of the sub-channels based on decoded bits and known input bits from which the codeword was generated. The transmitter 910 is configured to transmit to the encoder an indication that is based on the determined reliabilities of the sub-channels. The indication could be an indication of the reliabilities of the sub-channels. Other examples of such an indication are also disclosed herein.

The decoder 904 could implement any of various other features that are disclosed herein. For example, any one or more of the following could be provided, alone or in any of various combinations, in embodiments:

the code is a polar code;

the decoder is configured to decode multiple received words based on codewords that were generated from known input bits, and to determine the reliabilities of the sub-channels based on decoded bits and the known input bits from which the codewords were generated;

the decoder is configured to determine the reliabilities based on error probabilities of bit positions decoded by the decoder;

the decoder is configured to determine the error probabilities and sort indices of the sub-channels in a manner consistent with at least parts 2.4, 2.5, and 3 of the example iterative technique described above. In this regard, the decoder could be configured to determine the error probabilities by decoding bits at bit positions corresponding to the sub-channels from each of multiple received words that are based on respective codewords and known input bits from which each codeword was generated, and determining the error probabilities based on a number of decoding errors at each bit position. The indices of the sub-channels could then be sorted in an order of the error probabilities, which could be an increasing order or a decreasing order.

As noted above in the description of FIG. 8, although some of these example features refer to particular components being configured to perform certain operations, in other embodiments such features could be provided by other components. A processor, for example, could be configured to perform any of various operations that are disclosed herein by way of example in association with other components and/or in the context of method embodiments.

Communication equipment could include the apparatus 800, the apparatus 900, or both an encoder and a decoder. Such communication equipment could be user equipment or communication network equipment.

Figure 10:
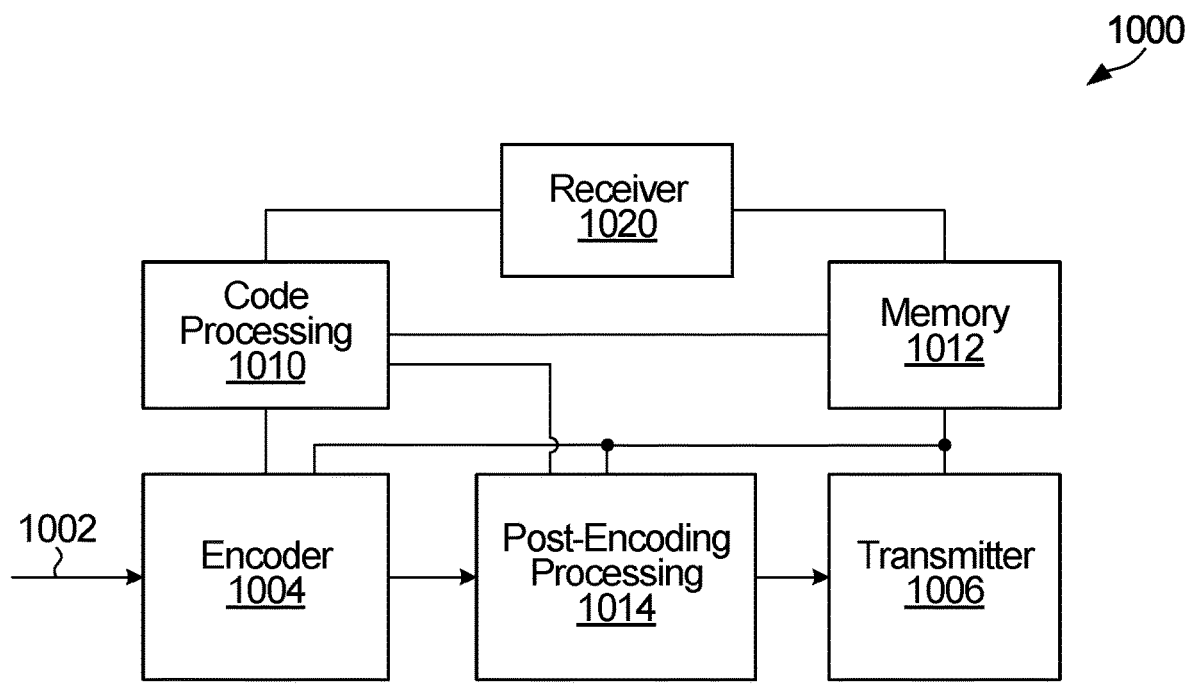
FIG. 10 is a block diagram of another example apparatus for encoding and transmitting codewords.

FIG. 10 is a block diagram of another example apparatus for encoding and transmitting codewords. The apparatus 1000 includes an encoder module 1004 coupled to a transmitter module 1006. The apparatus 1000 also includes a code processing module 1010 coupled to the encoder module 1004 and a post-encoding processing module 1014. The post-encoding processing module 1014 is also coupled to the encoder module 1004 and to the transmitter module 1006. A memory 1012, also shown in FIG. 10, is coupled to the encoder module 1004, to the code processing module 1010, to the post-encoding processing module 1014, and to the transmitter module 1006. Although not shown, the transmitter module 1006 could include a modulator, an amplifier, antenna and/or other modules or components of a transmit chain or alternatively could be configured to interface with a separate (RF) transmission module. A receiver module 1020 is coupled to the memory 1012 and to the code processing module 1010, and could also be coupled to other components such as the encoder module 1004. The receiver module 1020 could include could include an antenna, demodulator, amplifier, and/or other modules or components of a receive chain or alternatively could be configured to interface with a separate (RF) receiving module.

For example, some of all of the modules 1004, 1006, 1010, 1012, 1014, 1020 of the apparatus 1000 may be implemented in hardware or circuitry (e.g. in one or more chipsets, microprocessors, ASICs, FPGAs, dedicated logic circuitry, or combinations thereof) so as to produce codewords as described herein for transmission by a separate (RF) unit.

In some embodiments, the memory 1012 is a non-transitory computer readable medium at 1012, that includes instructions for execution by a processor to implement and/or control operation of the code processing module 1010, the encoder module 1004, the post-encoding processing module 1014, the transmitter module 1006, the receiver module 1020 in FIG. 10, and/or to otherwise control the execution of functionality and/or embodiments described herein. In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which could be, for example, a CD-ROM, USB flash disk, or a removable hard disk, at 1012.

In some embodiments, the encoder module 1004 is implemented in circuitry, such as a processor, that is configured to encode input bits as disclosed herein. In a processor-based implementation of the encoder module 1004, processor-executable instructions to configure a processor to perform encoding operations are stored in a non-transitory processor-readable medium. The non-transitory medium could include, in the memory 1012 for example, one or more solid-state memory devices and/or memory devices with movable and possibly removable storage media.

The code processing module 1010 could be implemented in circuitry that is configured to determine coding parameters such as mother code block length, and to determine an ordered sub-channel sequence as disclosed herein. In some embodiments, the code processing module 1010 is implemented using a processor. The same processor or other circuitry, or separate processors or circuitry, could be used to implement both the encoder module 1004 and the code processing module 1010. As noted above for the encoder module 1004, in a processor-based implementation of the code processing module 1010, processor-executable instructions to configure a processor to perform code processing operations are stored in a non-transitory processor-readable medium, in the memory 1012 for example.

Like the encoder module 1004 and the code processing module 1010, the post-encoding processing module 1014 is implemented in circuitry, such as a processor, that is configured to perform various post-encoding operations. These post-encoding operations could include rate-matching operations such as puncturing, shortening and/or interleaving, for example. In a processor-based implementation of the post-encoding processing module 1014, processor-executable instructions to configure a processor to perform post-encoding operations are stored in a non-transitory processor-readable medium, examples of which are described above. In an embodiment, the post-encoding processing module 1014 derives a puncturing or shortening scheme from a puncturing or shortening scheme that is to be applied to a codeword prior to transmission. Information indicative of bit positions and/or sub-channels that are affected by post-encoding operations, or information from which such bit positions or sub-channels may be determined, may be fed back to the code processing module 1010, stored to the memory 1012, or otherwise made available to the code processing module 1010 by the post-encoding processing module 1014.

In some embodiments of the code processing module 1010, the coding parameters and/or the ordered sub-channel sequence may be determined based on information from the post-encoding processing module 1014. For instance, an ordered sub-channel sequence could be determined or adjusted based in part on rate-matching as determined by the post-encoding processing module 1014. Conversely, in some other embodiments, the post-encoding processing module 1014 may determine rate-matching scheme based on the coding parameters and/or an ordered sub-channel sequence determined by the code processing module 1010. In yet some other embodiments, the determinations made within the code processing module 1010 and post-encoding processing module 1014 are jointly performed and optimized.

The apparatus 1000 could implement any of various other features that are disclosed herein. For example, the encoder module 1004, the transmitter module 1006, the code processing module 1010, the post-encoding processing module 1014, and/or the receiver module 1020 could be configured to implement any one or more of the features listed or otherwise described above with reference to FIG. 8.

In some alternative embodiments, the functionality of the encoder module 1004, the transmitter module 1006, the code processing module 1010, the post-encoding processing module 1014, and/or the receiver module 1020 described herein may be fully or partially implemented in hardware or alternatively in software, for example in modules stored in a memory such as 1012 and executed by one or more processors of the apparatus 1000.

An apparatus could therefore include a processor, and a memory such as 1012, coupled to the processor, storing instructions which, when executed by the processor, cause the processor to perform the functionality and/or embodiments described above in relation to the encoder module 1004, the transmitter module 1006, the code processing module 1010, the post-encoding module 1014, and/or the receiver module 1020 described herein.

Figure 11:
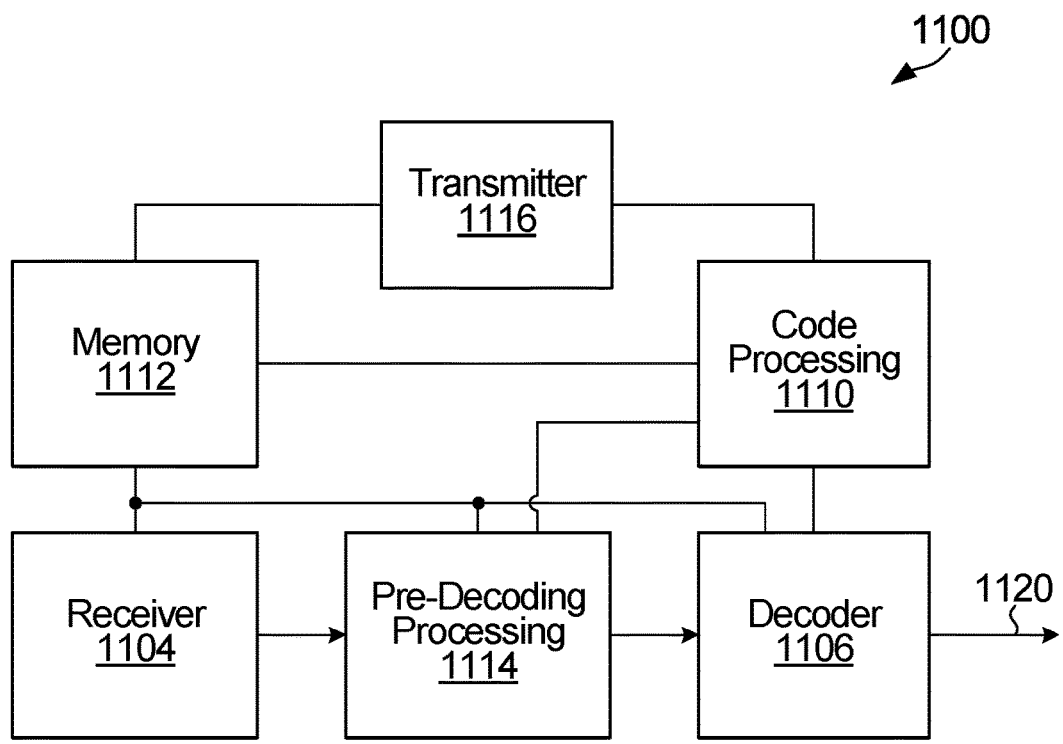
FIG. 11 is a block diagram of another example apparatus for receiving and decoding codewords.

FIG. 11 is a block diagram of an example apparatus for receiving and decoding codewords. The apparatus 1100 includes a receiver module 1104 which is configured to receive signals transmitted wirelessly and which is coupled to a decoder module 1106. The apparatus 1100 also includes a code processing module 1110 coupled to the decoder module 1106 and a pre-decoding processing module 1114. The pre-decoding processing module 1114 is also coupled to the decoder module 1106 and to the receiver module 1104. A memory 1112 also shown in FIG. 11, is coupled to the decoder module 1106, to the code processing module 1110, to the receiver module 1104, and to the pre-decoding processing module 1114. transmitter module 1116 is coupled to the memory 1112 and to the code processing module 1110, and could also be coupled to other components such as the decoder module 1106.

Although not shown, the receiver module 1104 could include an antenna, demodulator, amplifier, and/or other modules or components of a receive chain or alternatively could be configured to interface with a separate (RF) receiving module. Similarly, transmitter module 1116 could include a modulator, an amplifier, antenna and/or other modules or components of a transmit chain or alternatively could be configured to interface with a separate (RF) transmission module.

For example, some of all of the modules 1104, 1106, 1110, 1112, 1114, 1116 of the apparatus 1100 may be implemented in hardware or circuitry (e.g. in one or more chipsets, microprocessors, ASICs, FPGAs, dedicated logic circuitry, or combinations thereof) so as to receive a word based on a codeword and/or perform other operations as described herein.

Decoded bits are output at 1120 for further receiver processing, to determine sub-channel reliabilities, for example. Information that is indicative of, or otherwise based on, sub-channel reliabilities could be provided to the transmitter module 1116 for transmission to an encoding device for use in code design, as disclosed herein.

In some embodiments, the memory 1112 is a non-transitory computer readable medium that includes instructions for execution by a processor to implement and/or control operation of the receiver module 1104, the decoder module 1106, the code processing module 1110, the pre-decoding processing module 1114, and the transmitter module 1116 in FIG. 11, and/or to otherwise control the execution of functionality and/or embodiments described herein. In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which could be, for example, a CD-ROM, USB flash disk, or a removable hard disk, at 1112.

The decoder module 1106 is implemented in circuitry, such as a processor, that is configured to decode received codewords as disclosed herein. In a processor-based implementation of the decoder module 1106, processor-executable instructions to configure a processor to perform decoding operations are stored in a non-transitory processor-readable medium. The non-transitory medium could include, in the memory 1112 for example, one or more solid-state memory devices and/or memory devices with movable and possibly removable storage media.

The code processing module 1110 is implemented in circuitry that is configured to determine (and store to the memory 1112) ordered sub-channel sequences as disclosed herein. In a processor-based implementation of the code-processing module 1110, processor-executable instructions to configure a processor to perform code-processing operations are stored in a non-transitory processor-readable medium, examples of which are described above. Information representing ordered sub-channel sequences, and/or the selected sub-channels could be provided to the decoder module 1106 by the code processing module 1110 for use in decoding received words, and/or stored in the memory 1112 by the code processing module 1110 for subsequent use by the decoder module 1106. the code processing module 1110 could also or instead be configured to determine sub-channel reliabilities based on training or reference sequences as disclosed herein, and to provide to the transmitter module 1116 information that is indicative of, or otherwise based on, such sub-channel reliabilities.

Like the decoder module 1106 and the code processing module 1110, the pre-decoding processing module 1114 is implemented in circuitry, such as a processor, that is configured to perform pre-decoding operations. These operations could include receiver/decoder-side rate matching operations also known as de-rate-matching operations, such as de-puncturing and/or de-shortening to reverse puncturing/shortening that was applied at an encoder/transmitter side, for example. In a processor-based implementation of the pre-decoding processing module 1114, processor-executable instructions to configure a processor to perform pre-decoding processing operations are stored in a non-transitory processor-readable medium, examples of which are described above. In an embodiment, the pre-decoding processing module 1114 derives a puncturing or shortening scheme from a puncturing or shortening scheme that is to be applied to a received codeword. Information indicative of bit positions and/or sub-channels that are affected by pre-decoding processing, or information from which such bit positions or sub-channels may be determined, may be fed back to the code processing module 1110, stored to the memory 1112, or otherwise made available to the code processing module 1110 by the pre-decoding processing module 1114.

In some embodiments of the code processing module 1110, the ordered sub-channel sequence may be determined based on information from the pre-decoding processing module 1114. For instance, the ordered sub-channel sequence may be determined based on the rate-matching scheme determined by the pre-decoding processing module 1114. Conversely, in some other embodiments, the pre-decoding processing module 1114 may determine a rate-matching scheme based on the coding parameters and/or the ordered sub-channel sequence determined by the code processing module 1110. In yet some other embodiments, the determinations made within the code processing module 1110 and pre-decoding processing module 1114 are jointly performed and optimized.

In some alternative embodiments, the functionality of the receiver module 1104, the decoder module 1106, the code processing module 1110, the pre-decoding processing module 1114, and/or the transmitter module 1116 described herein may be fully or partially implemented in software or modules, for example in receiving and decoding modules stored in a memory 1112 and executed by one or more processors of the apparatus 1100.

An apparatus could therefore include a processor, and a memory such as 1112, coupled to the processor, storing instructions which, when executed by the processor, cause the processor to perform the functionality and/or embodiments disclosed herein, or receiving/decoding operations corresponding to transmitting/encoding operations disclosed herein.

The apparatus 1100 could implement any of various other features that are disclosed herein. For example, the decoder module 1106, the receiver module 1104, the code processing module 1110, the pre-decoding processing module 1114, and/or the transmitter module 1116 could be configured to implement any one or more of receiving/decoding features corresponding to encoding/transmitting features noted above.

Figure 12:
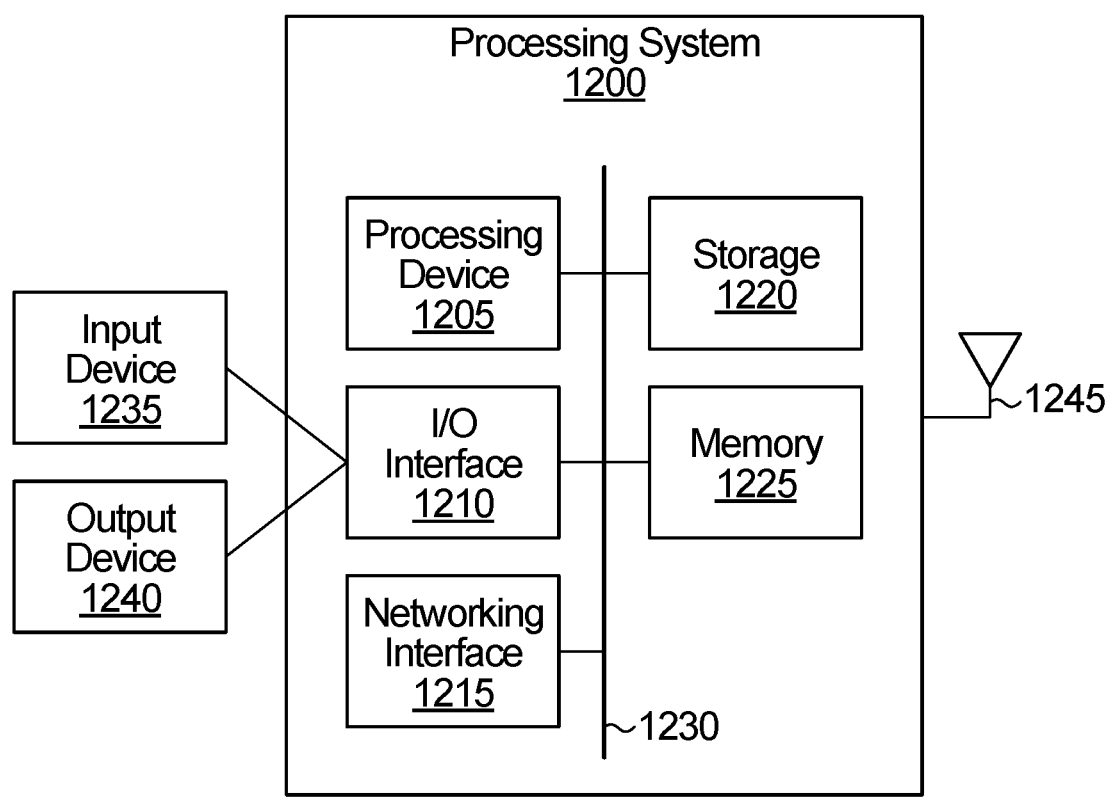
FIG. 12 is a block diagram of an example simplified processing system, which may be used to implement embodiments disclosed herein.

FIGS. 8 to 11 are generalized block diagrams of apparatus that could be used to implement embodiments disclosed herein, including, for example, blind code rate detection and decoding, and encoding of information for decoding by blind code rate detection. FIG. 12 is a block diagram of an example simplified processing system 1200, which may be used to implement embodiments disclosed herein, and provides a higher level implementation example. An apparatus 800 or 1000, an apparatus 900 or 1100, or both, may be implemented using the example processing system 1200, or variations of the processing system 1200. The processing system 1200 could be a server or a mobile device, for example, or any suitable processing system. Other processing systems suitable for implementing embodiments described in the present disclosure may be used, which may include components different from those discussed below. Although FIG. 12 shows a single instance of each component, there may be multiple instances of each component in the processing system 1200.

The processing system 1200 may include one or more processing devices 1205, such as a processor, a microprocessor, an ASIC, an FPGA, a dedicated logic circuitry, or combinations thereof. The processing system 1200 may also include one or more input/output (I/O) interfaces 1210, which may enable interfacing with one or more appropriate input devices 1235 and/or output devices 1240. The processing system 1200 may include one or more network interfaces 1215 for wired or wireless communication with a network (e.g., an intranet, the Internet, a P2P network, a WAN and/or a LAN) or other node. The network interfaces 1215 may include wired links (e.g., Ethernet cable) and/or wireless links (e.g., one or more antennas) for intra-network and/or inter-network communications. The network interfaces 1215 may provide wireless communication via one or more transmitters or transmit antennas and one or more receivers or receive antennas, for example. In this example, a single antenna 1245 is shown, which may serve as both transmitter and receiver. However, in other examples there may be separate antennas for transmitting and receiving. The processing system 1200 may also include one or more storage units 1220, which may include a mass storage unit such as a solid state drive, a hard disk drive, a magnetic disk drive and/or an optical disk drive.

The processing system 1200 may include one or more memories 1225, which may include a volatile or non-volatile memory (e.g., a flash memory, a random access memory (RAM), and/or a read-only memory (ROM)). The non-transitory memories 1225 may store instructions for execution by the processing devices 1205, such as to carry out examples described in the present disclosure. The memories 1225 may include other software instructions, such as for implementing an operating system and other applications/functions. In some examples, one or more data sets and/or modules may be provided by an external memory (e.g., an external drive in wired or wireless communication with the processing system 1200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 1230 providing communication among components of the processing system 1200. The bus 1230 may be any suitable bus architecture including, for example, a memory bus, a peripheral bus or a video bus. In FIG. 12, the input devices 1235 (e.g., a keyboard, a mouse, a microphone, a touchscreen, and/or a keypad) and output devices 1240 (e.g., a display, a speaker and/or a printer) are shown as external to the processing system 1200. In other examples, one or more of the input devices 1235 and/or the output devices 1240 may be included as a component of the processing system 1200.

Figure 13:
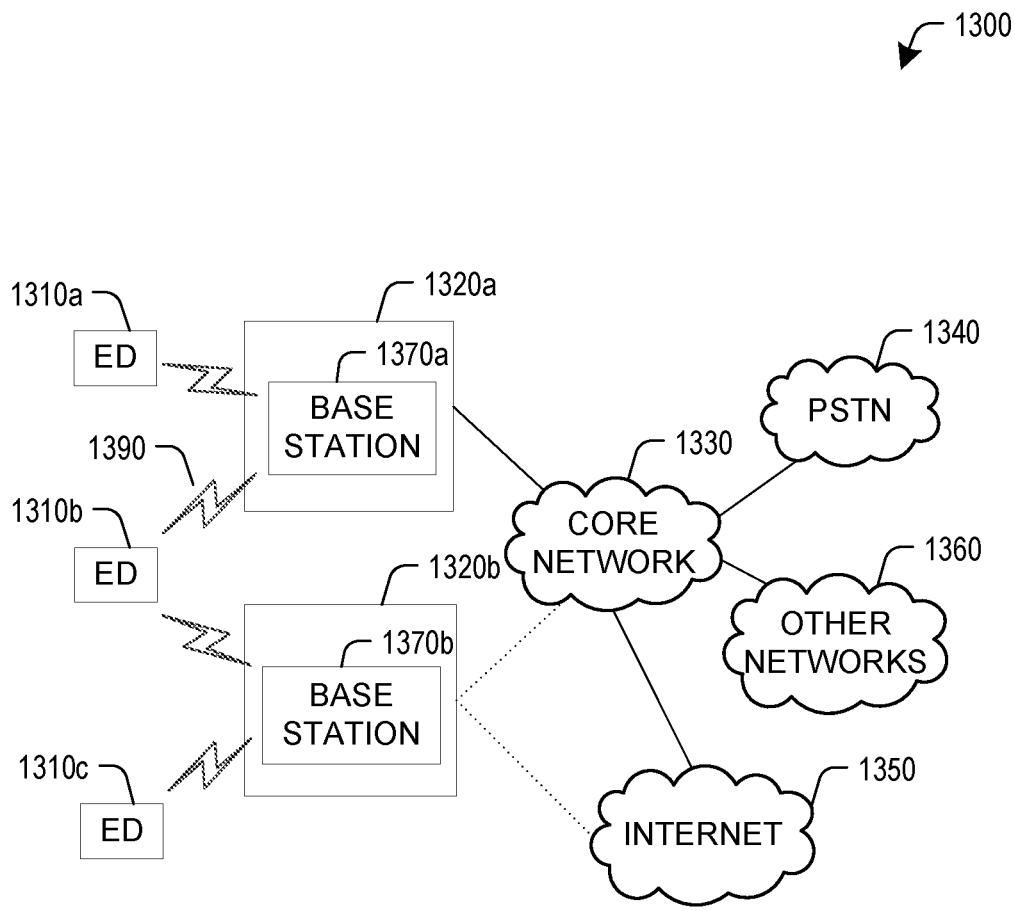
FIG. 13 illustrates an example communication system in which embodiments of the present disclosure could be implemented.

FIG. 13 illustrates an example communication system 1300 in which embodiments of the present disclosure could be implemented. In general, the communication system 1300 enables multiple wireless or wired elements to communicate data and other content. The purpose of the communication system 1300 may be to provide content (voice, data, video, text) via broadcast, narrowcast, user device to user device, etc. The communication system 1300 may operate by sharing resources such as bandwidth.

In this example, the communication system 1300 includes electronic devices (ED) 1310a-1310c, radio access networks (RANs) 1320a-1320b, a core network 1330, a public switched telephone network (PSTN) 1340, the internet 1350, and other networks 1360. Although certain numbers of these components or elements are shown in FIG. 13, any reasonable number of these components or elements may be included.

The EDs 1310a-1310c and base stations 1370a-1370b are examples of communication equipment that can be configured to implement some or all of the functionality and/or embodiments described herein. For example, any one of the EDs 1310a-1310c and base stations 1370a-1370b could be configured to implement the encoding or decoding functionality (or both) described above. In another example, any one of the EDs 1310a-1310c and base stations 1370a-1370b could include an apparatus 800 (FIG. 8) or 1000 (FIG. 10), an apparatus 900 (FIG. 9) or 1100 (FIG. 11), or both.

The EDs 1310a-1310c are configured to operate, communicate, or both, in the communication system 1300. For example, the EDs 1310a-1310c are configured to transmit, receive, or both via wireless or wired communication channels. Each ED 1310a-1310c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 13, the RANs 1320a-1320b include base stations 1370a-1370b, respectively. Each base station 1370a-1370b is configured to wirelessly interface with one or more of the EDs 1310a-1310c to enable access to any other base station 1370a-1370b, the core network 1330, the PSTN 1340, the Internet 1350, and/or the other networks 1360. For example, the base stations 1370a-1370b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 1310a-1310c may be alternatively or additionally configured to interface, access, or communicate with any other base station 1370a-1370b, the internet 1350, the core network 1330, the PSTN 1340, the other networks 1360, or any combination of the preceding. The communication system 1300 may include RANs, such as RAN 1320b, wherein the corresponding base station 1370b accesses the core network 1330 via the internet 1350, as shown.

The EDs 1310a-1310c and base stations 1370a-1370b are examples of communication equipment that can be configured to implement some or all of the functionality and/or embodiments described herein. In the embodiment shown in FIG. 13, the base station 1370a forms part of the RAN 1320a, which may include other base stations, base station controller(s) (BSC), radio network controller(s) (RNC), relay nodes, elements, and/or devices. Any base station 1370a, 1370b may be a single element, as shown, or multiple elements, distributed in the corresponding RAN, or otherwise. Also, the base station 1370b forms part of the RAN 1320b, which may include other base stations, elements, and/or devices. Each base station 1370a-1370b transmits and/or receives wireless signals within a particular geographic region or area, sometimes referred to as a "cell" or "coverage area". A cell may be further divided into cell sectors, and a base station 1370a-1370b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 1320a-1320b shown is exemplary only. Any number of RAN may be contemplated when devising the communication system 1300.

The base stations 1370a-1370b communicate with one or more of the EDs 1310a-1310c over one or more air interfaces 1390 using wireless communication links e.g. RF, microwave, infrared (IR), etc. The air interfaces 1390 may utilize any suitable radio access technology. For example, the communication system 1300 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 1390.

A base station 1370a-1370b may implement Universal Mobile Telecommunication System (UMTS) Terrestrial Radio Access (UTRA) to establish an air interface 1390 using wideband CDMA (WCDMA). In doing so, the base station 1370a-1370b may implement protocols such as HSPA, HSPA+ optionally including HSDPA, HSUPA or both. Alternatively, a base station 1370a-1370b may establish an air interface 1390 with Evolved UTMS Terrestrial Radio Access (E-UTRA) using LTE, LTE-A, and/or LTE-B. It is contemplated that the communication system 1300 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 1320a-1320b are in communication with the core network 1330 to provide the EDs 1310a-1310c with various services such as voice, data, and other services. The RANs 1320a-1320b and/or the core network 1330 may be in direct or indirect communication with one or more other RANs (not shown), which may or may not be directly served by core network 1330, and may or may not employ the same radio access technology as RAN 1320a, RAN 1320b or both. The core network 1330 may also serve as a gateway access between (i) the RANs 1320a-1320b or EDs 1310a-1310c or both, and (ii) other networks (such as the PSTN 1340, the internet 1350, and the other networks 1360). In addition, some or all of the EDs 1310a-1310c may include functionality for communicating with different wireless networks over different wireless links using different wireless technologies and/or protocols. Instead of wireless communication (or in addition thereto), the EDs 1310a-1310c may communicate via wired communication channels to a service provider or switch (not shown), and to the internet 1350. PSTN 1340 may include circuit switched telephone networks for providing plain old telephone service (POTS). Internet 1350 may include a network of computers and subnets (intranets) or both, and incorporate protocols, such as IP, TCP, UDP. EDs 1310a-1310c may be multimode devices capable of operation according to multiple radio access technologies, and incorporate multiple transceivers necessary to support such.

Figure 14A:
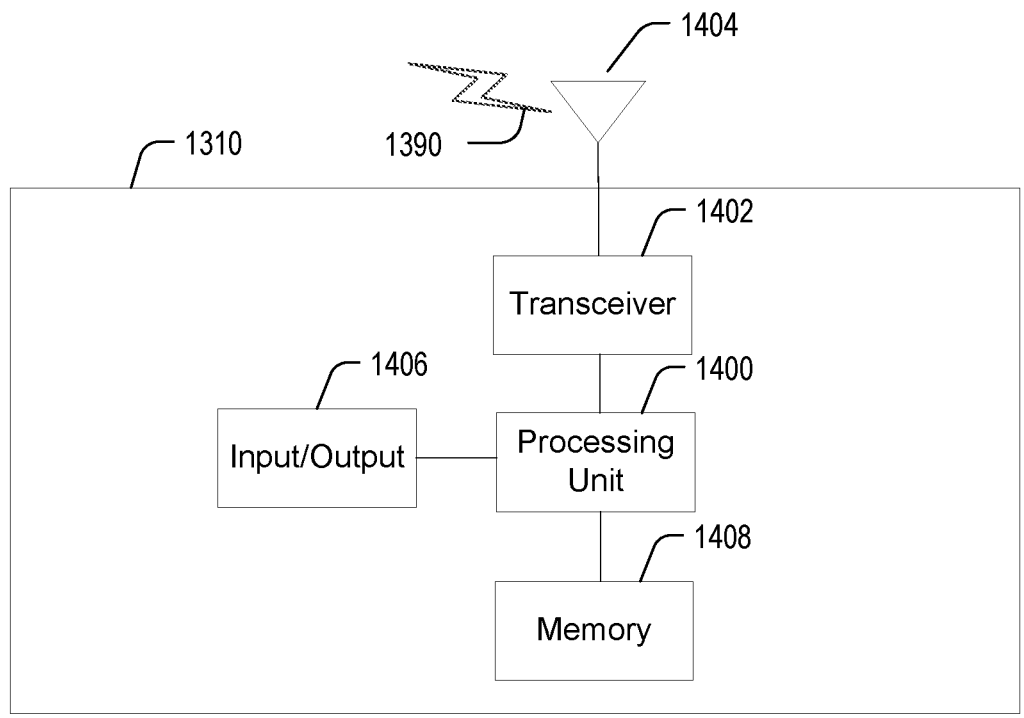
FIGS. 14A and 14B illustrate example devices that may implement the methods and teachings according to this disclosure.
Figure 14B:
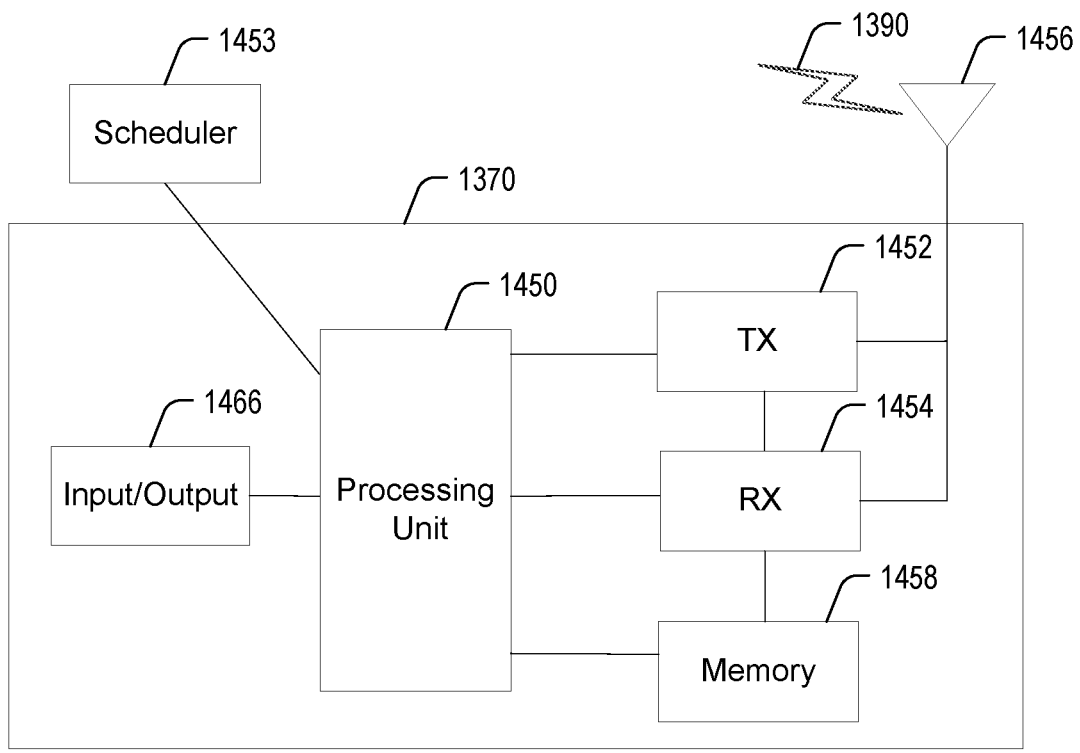

FIGS. 14A and 14B illustrate example devices that may implement the methods and teachings according to this disclosure. In particular, FIG. 14A illustrates an example ED 1310, and FIG. 14B illustrates an example base station 1370. These components could be used in the communication system 1300 or in any other suitable system.

As shown in FIG. 14A, the ED 1310 includes at least one processing unit 1400. The processing unit 1400 implements various processing operations of the ED 1310. For example, the processing unit 1400 could perform signal coding, data processing, power control, input/output processing, or any other functionality enabling the ED 1310 to operate in the communication system 1300. The processing unit 1400 may also be configured to implement some or all of the functionality and/or embodiments described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1310 also includes at least one transceiver 1402. The transceiver 1402 is configured to modulate data or other content for transmission by at least one antenna or Network Interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1310, and one or multiple antennas 1404 could be used in the ED 1310. Although shown as a single functional unit, a transceiver 1402 could also be implemented using at least one transmitter and at least one separate receiver.

The ED 1310 further includes one or more input/output devices 1406 or interfaces (such as a wired interface to the internet 1350). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1310 includes at least one memory 1408. The memory 1408 stores instructions and data used, generated, or collected by the ED 1310. For example, the memory 1408 could store software instructions or modules configured to implement some or all of the functionality and/or embodiments described above and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the base station 1370. The processing unit 1450 implements various processing operations of the base station 1370, such as signal coding, data processing, power control, input/output processing, or any other functionality. The processing unit 1450 can also be configured to implement some or all of the functionality and/or embodiments described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the ED 1310. The memory 1458 stores instructions and data used, generated, or collected by the base station 1370. For example, the memory 1458 could store software instructions or modules configured to implement some or all of the functionality and/or embodiments described above and that are executed by the processing unit(s) 1450.

Each input/output device 1466 permits interaction with a user or other devices in the network. Each input/output device 1466 includes any suitable structure for providing information to or receiving/providing information from a user, including network interface communications.

The embodiments described with reference to FIGS. 8 to 14B relate to example apparatus. Method embodiments, for decoding and/or encoding, are also contemplated.

Figure 15:
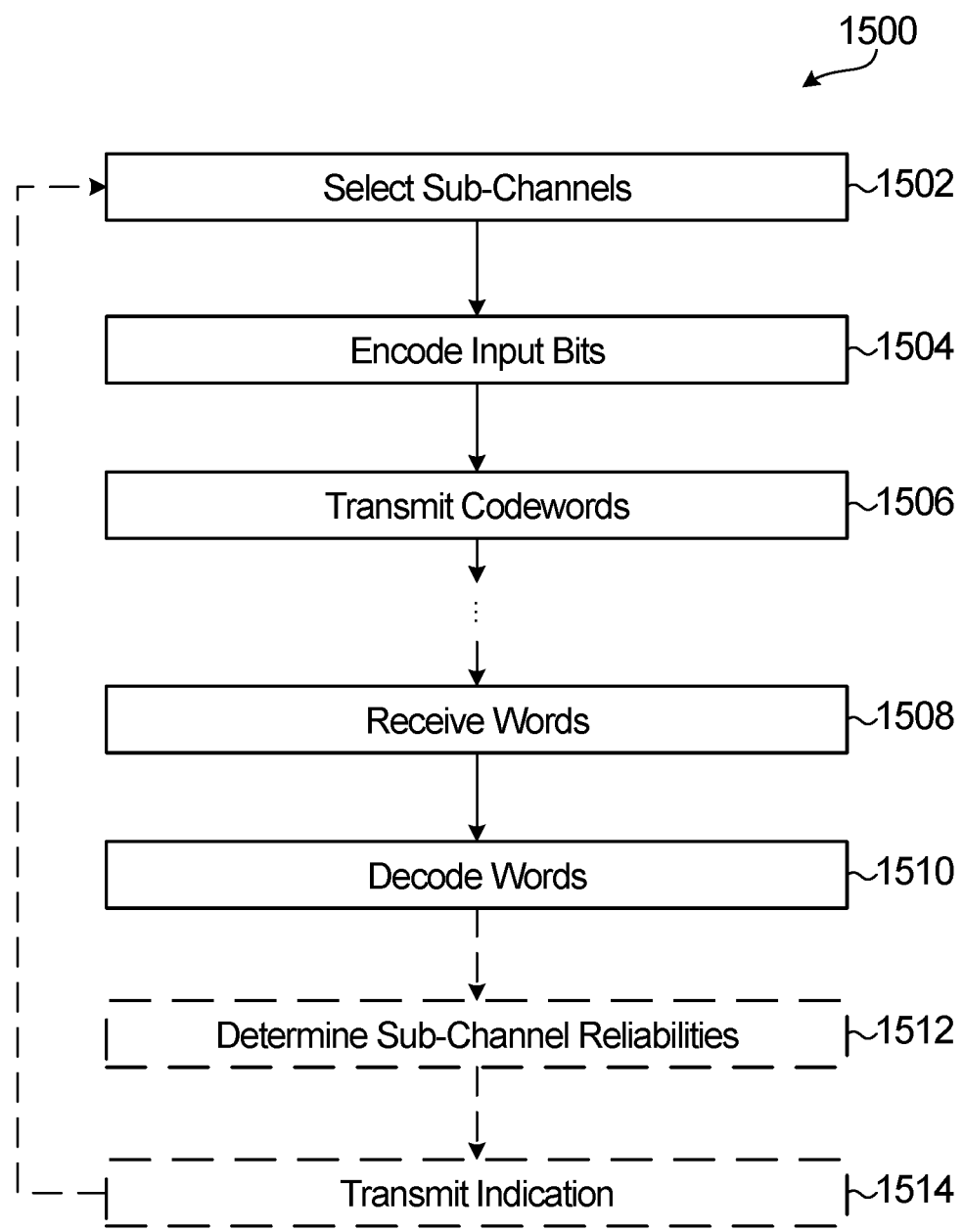
FIG. 15 is a flow diagram of an example method according to another embodiment.

FIG. 15 is a flow diagram of an example method according to another embodiment. The illustrated example method 1500 includes, at 1502, selection of code sub-channels for encoding input bits. Each of the sub-channels has an associated reliability of correct decoding of an input bit at an input bit position. The example method 1500 also involves encoding input bits at input bit positions onto the sub-channels. For example, information bits may be encoded at 1504 onto channels that are selected as information sub-channels at 1502, and other sub-channels may be frozen sub-channels. Codewords that are generated by the encoding at 1504 are transmitted at 1506.

FIG. 15 also shows example operations that are performed at a receiver/decoder. One or more words based on a codeword of a code are received from an encoder at 1508. As noted above, the code provides sub-channels onto which input bits at input bit positions are encoded, and each of the sub-channels has an associated reliability of correct decoding of an input bit at an input bit position. Each received word is decoded at 1510. During training in accordance with embodiments disclosed herein, the reliabilities of the sub-channels are determined at 1512 based on decoded bits and known input bits from which each codeword was generated.

At 1514, which is representative of another operation associated with training during code design as disclosed herein, an indication based on the determined reliabilities of the sub-channels is transmitted to the encoder. The indication could be an indication of the reliabilities of the sub-channels. Other examples of such an indication are also disclosed herein. This indication is received by the encoder, and could be used by the encoder at 1502 in selecting the sub-channels for encoding subsequent input bits.

Sub-channel reliabilities need not be determined every time input bits are to be encoded. The example method 1500 could instead be repeated only periodically to adapt or re-train an encoder to changing channel conditions, for example. Training-related operations are shown in FIG. 15 using dashed lines. Other operations show in FIG. 15 are illustrative of operations that are involved in coding for communication of data between a transmitting device or system and a receiving device or system.

The example method in FIG. 15 is intended for illustrative purposes. Other embodiments could involve performing the illustrated operations in any of various ways, performing fewer or additional operations, and/or varying the order in which operations are performed. Other variations could be or become apparent to a skilled person based on the present disclosure.

For example, any one or more of the following could be provided, alone or in any of various combinations, in embodiments:

the code is a polar code;

the selecting at 1502 involves selecting from the sub-channels information sub-channels onto which information bits in further input bits are to be encoded;

the encoding at 1504 involves encoding multiple known information vectors onto the sub-channels;

the transmitting at 1506 involves transmitting a codeword generated from encoding each of the known information vectors to the decoder;

the indication is based on whether the known information vectors are successfully decoded by the decoding at 1510;

the indication includes sorted indices of the input bit positions or sorted indices of the sub-channels;

the decoding at 1510 involves decoding multiple received words based on codewords that were generated from known input bits, the determining at 1512 involves determining the reliabilities of the sub-channels based on decoded bits and the known input bits from which the codewords were generated;

the determining at 1512 involves determining the reliabilities based on error probabilities of bit positions decoded by the decoding;

the decoding at 1510 and the determining at 1514 are consistent with at least parts 2.4, 2.5, and 3 of the example iterative technique described above. For example, in such an iterative technique the decoding could involve decoding bits at bit positions corresponding to the sub-channels from each of multiple received words that are based on respective codewords and known input bits from which each codeword was generated. Determining the reliabilities based on error probabilities could then involve determining the error probabilities based on a number of decoding errors at each bit position.

In another embodiment, a non-transitory processor-readable medium stores instructions which, when executed by one or more processors, cause the one or more processors to perform a method as disclosed herein.

Figure 16:
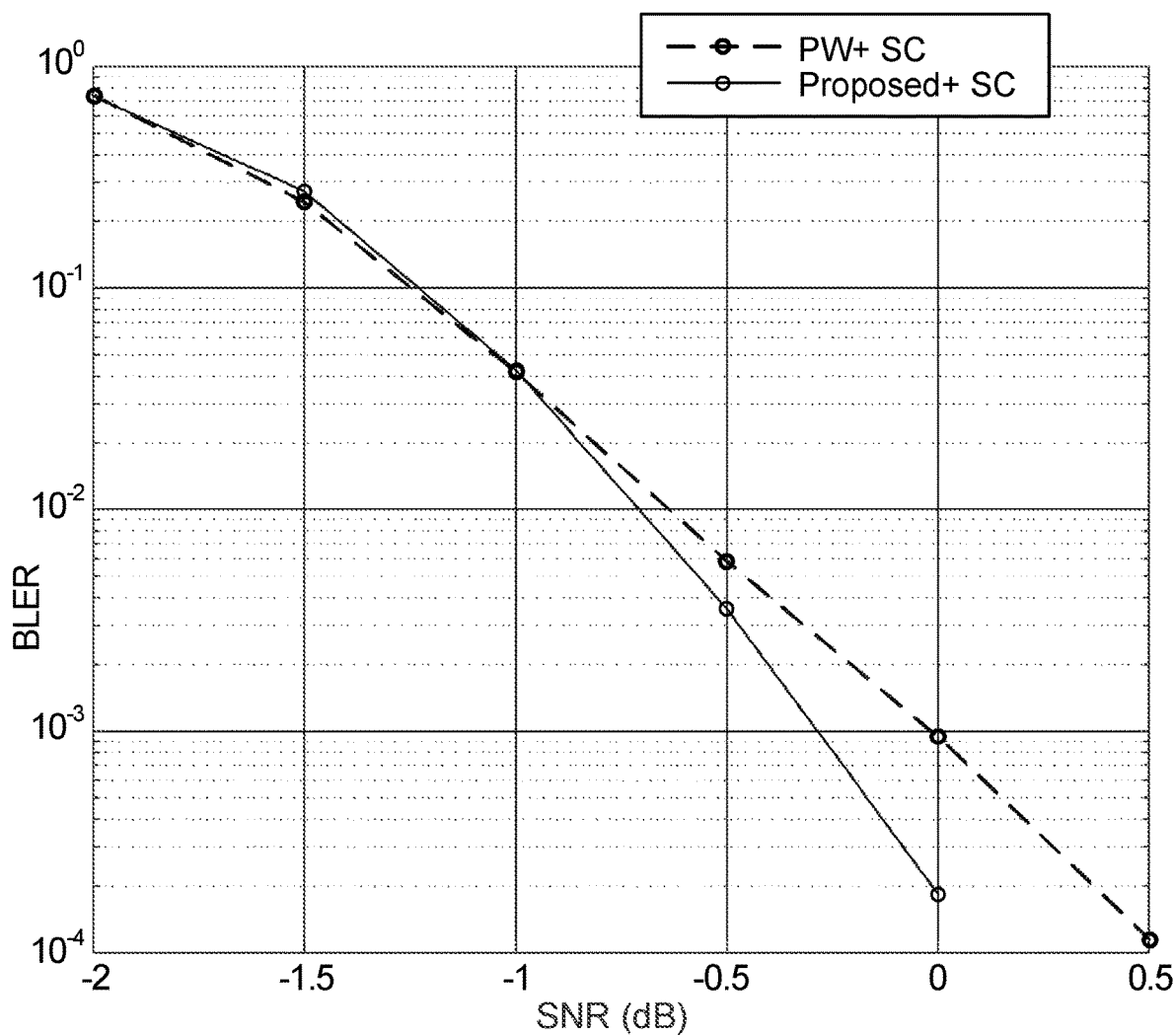
FIG. 16 is an example plot of Block Error Rate (BLER) versus Signal to Noise Ratio (SNR) for simulations of Polarization Weight (PW) code design with Successive Cancellation (SC) decoding, and code design as proposed herein with SC decoding.

FIG. 16 is an example plot of BLER versus SNR for simulations of PW code design with SC decoding, and code design as proposed herein with SC decoding. These simulation results are for code rate R=½, N=2048, a design SNR of 0 dB, and a Binary Additive White Gaussian Noise (BIAWGN) channel, with Binary Phase Shift Keying (BPSK) modulation. Similar or different results may be observed in other simulations or actual implementations.

As can be seen from FIG. 16, coding gain can be realized over the PW+SC method. In an actual wireless channel, coding gain is expected to be better because the code design as disclosed herein is based on the actual channel observed at a receiver, and takes into account such factors as errors that are introduced by and/or propagated through components that are used to implement the channel, interference from other UEs and access points, channel mismatch with Channel State Information (CSI) reporting, and channel variation including time-variance and fading. All of these factors are integrated into observations of the actual wireless channel at a receiver.

Training-based code design as proposed herein does not involve a channel model, but instead directly designs a code for an actual complex wireless channel. Factors in various different parts of a communication system between a transmitter and a receiver are taken into account, including interference from other UEs, channel SNR mismatch, fading types, Doppler effects, jitter, etc. Such a code design technique could be used to compensate for effects of any intervening components between a transmitter and a receiver, including a channel demodulator and decoder, for example.

As shown in FIG. 16, such a coding design technique could increase coding gain over current code design techniques. Code design directly for actual wireless channels, and not the models, is expected to provide significant coding gain. Lower power consumption could also be achieved as a result of such coding gain.

With better code performance over a channel, it may also be possible to simplify a decoder. For example, in some applications wireless channels could be quite stable, and it may be possible to select sub-channels based on training as disclosed herein, to design a code for a stable fading channel. SC decoding or SCL decoding with a small list size could then be used for decoding and still provide good performance.

Training-based code design comes at a cost of running a training phase, when communications are first initiated and possibly thereafter. Training could be repeated, for example, periodically and/or depending on the communication environment, when the channel is expected to have changed. Although training is an additional operation that is not performed in other code design techniques, decoding of received words that are based on codewords generated from known input bits can be low complexity relative to model-based techniques. Decoding during training could involve SC decoding, for example, using the same decoding resources that are already implemented for decoding during communications.

The previous description of some embodiments is provided to enable any person skilled in the art to make or use an apparatus, method, or processor readable medium according to the present disclosure.

Various modifications to the embodiments described herein may be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

For example, although embodiments are described primarily with reference to bits, other embodiments may involve non-binary and/or multi-bit symbols.

As noted above, polar codes have been selected for uplink and downlink eMBB control channel coding for the new 5G air interface, also known as 5G new radio (NR). The techniques disclosed herein could be used not only for control data over a control channel but also or instead other types of data (e.g. user data) over any type of channel (e.g. a data channel).

Illustrative examples described herein refer to sub-channel sequences that are in increasing order of a reliability metric. In other embodiments, ordered sequences that are in decreasing reliability order could be used. Similarly, sequences could be generated in increasing order of reliability rather than starting with more reliable channels and building a sequence by adding sub-channels with progressively decreasing reliabilities.

Additional example embodiments are also described below.

According to an example 1, an apparatus includes: an encoder to encode input bits at input bit positions onto sub-channels that are provided by a code, each of the sub-channels having an associated reliability of correct decoding of an input bit at an input bit position; a transmitter, coupled to the encoder, to transmit codewords generated by the encoder; and a receiver, coupled to the encoder, to receive from a decoder of a codeword that was transmitted by the transmitter, an indication of the reliabilities of the sub-channels.

An example 2 relates to the apparatus of example 1, wherein the code is a polar code.

An example 3 relates to the apparatus of example 1 or example 2, further including: a sub-channel selector, coupled to the encoder, to select from the sub-channels information sub-channels onto which information bits in further input bits are to be encoded.

An example 4 relates to the apparatus of any one of examples 1 to 3, wherein the encoder is configured to encode multiple known information vectors onto the sub-channels and to transmit a codeword generated from encoding each of the known information vectors to the decoder, and wherein the indication of the reliabilities is based on whether the known information vectors are successfully decoded by the decoder.

An example 5 relates to the apparatus of any one of examples 1 to 4, wherein the indication of the reliabilities comprises sorted indices of the input bit positions or sorted indices of the sub-channels.

According to an example 6, an apparatus includes: a receiver to receive from an encoder a word that is based on a codeword of a code, the code providing sub-channels onto which input bits at input bit positions are encoded, each of the sub-channels having an associated reliability of correct decoding of an input bit at an input bit position; a decoder, coupled to the receiver, to decode the received word and to determine the reliabilities of the sub-channels based on decoded bits and known input bits from which the codeword was generated; and a transmitter, coupled to the decoder, to transmit to the encoder an indication of the determined reliabilities of the sub-channels.

An example 7 relates to the apparatus of example 6, wherein the code is a polar code.

An example 8 relates to the apparatus of example 6 or example 7, wherein the decoder is configured to decode multiple received words based on codewords that were generated from known input bits, and to determine the reliabilities of the sub-channels based on decoded bits and the known input bits from which the codewords were generated.

An example 9 relates to the apparatus of any one of examples 6 to 8, wherein the decoder is configured to determine the reliabilities based on error probabilities of bit positions decoded by the decoder.

An example 10 relates to the apparatus of example 9, wherein the decoder is configured to determine the error probabilities and sort indices of the sub-channels in a manner consistent with at least parts 2.4, 2.5, and 3 of the example iterative technique described above.

According to another example 11, a method involves: encoding input bits at input bit positions onto sub-channels that are provided by a code, each of the sub-channels having an associated reliability of correct decoding of an input bit at an input bit position; transmitting codewords generated by the encoding; and receiving, from a decoder of a transmitted codeword, an indication of the reliabilities of the sub-channels.

An example 12 relates to the method of example 11, wherein the code is a polar code.

An example 13 relates to the method of example 11 or example 12, further including: selecting from the sub-channels information sub-channels onto which information bits in further input bits are to be encoded.

An example 14 relates to the method of any one of examples 11 to 13, wherein the encoding comprises encoding multiple known information vectors onto the sub-channels, wherein the transmitting comprises transmitting a codeword generated from encoding each of the known information vectors to the decoder, and wherein the indication of the reliabilities is based on whether the known information vectors are successfully decoded by the decoding.

An example 15 relates to the method of any one of examples 11 to 14, wherein the indication of the reliabilities comprises sorted indices of the input bit positions or sorted indices of the sub-channels.

According to an example 16, a method involves: receiving from an encoder a word that is based on a codeword of a code, the code providing sub-channels onto which input bits at input bit positions are encoded, each of the sub-channels having an associated reliability of correct decoding of an input bit at an input bit position; decoding the received word; determining the reliabilities of the sub-channels based on decoded bits and known input bits from which the codeword was generated; and transmitting to the encoder an indication of the determined reliabilities of the sub-channels.

An example 17 relates to the method of example 16, wherein the code is a polar code.

An example 18 relates to the method of example 16 or example 17, wherein the decoding comprises decoding multiple received words based on codewords that were generated from known input bits, and wherein the determining comprises determining the reliabilities of the sub-channels based on decoded bits and the known input bits from which the codewords were generated.

An example 19 relates to the method of any one of examples 16 to 18, wherein the determining comprises determining the reliabilities based on error probabilities of bit positions decoded by the decoding.

An example 20 relates to the method of example 19, wherein the decoding and the determining are consistent with at least parts 2.4, 2.5, and 3 of the example iterative technique described above.

An example 21 relates to user equipment that includes the apparatus of any one of examples 1 to 10.

An example 22 relates to communication network equipment that includes the apparatus of any one of examples 1 to 10.

According to an example 23, a non-transitory processor-readable medium stores instructions which, when executed by one or more processors, cause the one or more processors to perform the method of any one of examples 11 to 20.

In another example, one or more codewords are generated by encoding input bits at input bit positions onto sub-channels that are provided by a code. Each of the sub-channels has an associated reliability of correct decoding of an input bit at an input bit position. Each codeword is transmitted to a decoder, and a word based on each transmitted codeword is received at the decoder. Each received word is decoded, and the reliabilities of the sub-channels are determined based on decoded bits and known input bits from which each codeword was generated. An indication of the determined reliabilities of the sub-channels is transmitted to the encoder, and may be used by the encoder in selecting the sub-channels for encoding subsequent input bits, for example.

The invention claimed is:

1. An apparatus comprising:
   an encoder to encode input bits at input bit positions onto sub-channels that are provided by a code, each of the sub-channels having an associated reliability of correct decoding of an input bit at an input bit position;
   a transmitter, coupled to the encoder, to transmit codewords generated by the encoder; and
   a receiver, coupled to the encoder, to receive from a decoder of a codeword that was transmitted by the transmitter, an indication that is based on the reliabilities of the sub-channels, the input bits from which the codeword was generated being known to the decoder for determining the reliabilities of the sub-channels.

2. The apparatus of claim 1, wherein the code is a polar code.

3. The apparatus of claim 1, further comprising:
   a sub-channel selector, coupled to the encoder, to select from the sub-channels information sub-channels onto which information bits in further input bits are to be encoded.

4. The apparatus of claim 1, wherein the encoder is configured to encode multiple known information vectors onto the sub-channels and to transmit a codeword generated from encoding each of the known information vectors to the decoder, and wherein the indication is determined by the decoder based on whether the known information vectors are successfully decoded by the decoder.

5. The apparatus of claim 1, wherein the indication comprises sorted indices of the input bit positions or sorted indices of the sub-channels.

6. An apparatus comprising:
   a receiver to receive from an encoder a word that is based on a codeword of a code, the code providing sub-channels onto which input bits at input bit positions are encoded, each of the sub-channels having an associated reliability of correct decoding of an input bit at an input bit position;
   a decoder, coupled to the receiver, to decode the received word and to determine the reliabilities of the sub-channels based on decoded bits and known input bits from which the codeword was generated; and
   a transmitter, coupled to the decoder, to transmit to the encoder an indication that is based on the determined reliabilities of the sub-channels.

7. The apparatus of claim 6, wherein the code is a polar code.

8. The apparatus of claim 6, wherein the decoder is configured to decode multiple received words based on codewords that were generated from known input bits, and to determine the reliabilities of the sub-channels based on decoded bits and the known input bits from which the codewords were generated.

9. The apparatus of claim 6, wherein the decoder is configured to determine the reliabilities based on error probabilities of bit positions decoded by the decoder.

10. The apparatus of claim 9, wherein the decoder is configured to determine the error probabilities by decoding bits at bit positions corresponding to the sub-channels from each of multiple received words that are based on respective codewords and known input bits from which each codeword was generated and determining the error probabilities based on a number of decoding errors at each bit position, and to sort indices of the sub-channels in an order of the error probabilities.

11. A method comprising:
    encoding input bits at input bit positions onto sub-channels that are provided by a code, each of the sub-channels having an associated reliability of correct decoding of an input bit at an input bit position;
    transmitting codewords generated by the encoding; and
    receiving, from a decoder of a transmitted codeword, an indication that is based on the reliabilities of the sub-channels, the input bits from which the transmitted codeword was generated being known to the decoder for determining the reliabilities of the sub-channels.

12. The method of claim 11, wherein the code is a polar code.

13. The method of claim 11, further comprising:
    selecting from the sub-channels information sub-channels onto which information bits in further input bits are to be encoded.

14. The method of claim 11,
    wherein the encoding comprises encoding multiple known information vectors onto the sub-channels,
    wherein the transmitting comprises transmitting a codeword generated from encoding each of the known information vectors to the decoder, and
    wherein the indication is determined by the decoder based on whether the known information vectors are successfully decoded by the decoding.

15. The method of claim 11, wherein the indication comprises sorted indices of the input bit positions or sorted indices of the sub-channels.

16. A method comprising:
    receiving from an encoder a word that is based on a codeword of a code, the code providing sub-channels onto which input bits at input bit positions are encoded, each of the sub-channels having an associated reliability of correct decoding of an input bit at an input bit position;
    decoding the received word;
    determining the reliabilities of the sub-channels based on decoded bits and known input bits from which the codeword was generated; and
    transmitting to the encoder an indication that is based on the determined reliabilities of the sub-channels.

17. The method of claim 16, wherein the code is a polar code.

18. The method of claim 16,
    wherein the decoding comprises decoding multiple received words based on codewords that were generated from known input bits, and
    wherein the determining comprises determining the reliabilities of the sub-channels based on decoded bits and the known input bits from which the codewords were generated.

19. The method of claim 16, wherein the determining comprises determining the reliabilities based on error probabilities of bit positions decoded by the decoding.

20. The method of claim 19, wherein the decoding comprises decoding bits at bit positions corresponding to the sub-channels from each of multiple received words that are based on respective codewords and known input bits from which each codeword was generated, and wherein the determining comprises determining the error probabilities based on a number of decoding errors at each bit position.

* * * * *